United States Patent
Castaneda et al.

(10) Patent No.: US 9,145,163 B2
(45) Date of Patent: Sep. 29, 2015

(54) ELECTRICAL STEERING ASSIST FEATURES FOR MATERIALS HANDLING VEHICLES

(71) Applicants: Anthony T. Castaneda, Troy, OH (US); Todd M. Fullenkamp, Fort Recovery, OH (US); Eric L. Jensen, Fort Myers, FL (US); Stephen T. Mangette, Delphos, OH (US); Jared J. Ranly, Maria Stein, OH (US); Vernon W. Siefring, Covington, OH (US)

(72) Inventors: Anthony T. Castaneda, Troy, OH (US); Todd M. Fullenkamp, Fort Recovery, OH (US); Eric L. Jensen, Fort Myers, FL (US); Stephen T. Mangette, Delphos, OH (US); Jared J. Ranly, Maria Stein, OH (US); Vernon W. Siefring, Covington, OH (US)

(73) Assignee: Crown Equipment Corporation, New Bremen, OH (US)

( * ) Notice: Subject to any disclaimer, the term of this patent is extended or adjusted under 35 U.S.C. 154(b) by 0 days.

(21) Appl. No.: 14/208,561

(22) Filed: Mar. 13, 2014

(65) Prior Publication Data

US 2014/0262593 A1    Sep. 18, 2014

Related U.S. Application Data

(60) Provisional application No. 61/783,329, filed on Mar. 14, 2013.

(51) Int. Cl.
*B62D 1/14* (2006.01)
*B62D 5/04* (2006.01)
(Continued)

(52) U.S. Cl.
CPC ...... *B62D 5/046* (2013.01); *B62D 1/14* (2013.01); *B62D 6/10* (2013.01); *B66F 9/07568* (2013.01)

(58) Field of Classification Search
CPC ............ B62D 51/02; B62D 51/04; B66F 9/06
USPC .............. 180/446, 19.1, 19.2, 19.3, 332, 333, 180/334, 65.1, 65.8
See application file for complete search history.

(56) References Cited

U.S. PATENT DOCUMENTS

| 3,047,783 A | 7/1962 | Van Oort et al. |
| 3,086,465 A | 4/1963 | De Montfort |

(Continued)

FOREIGN PATENT DOCUMENTS

| DE | 3327808 A1 | 2/1985 |
| DE | 102007047838 A | 5/2009 |

(Continued)

OTHER PUBLICATIONS

Crown Brochure for Low Level Order Picker, Crown Gabelstapler GmbH, Roding, Germany.

(Continued)

*Primary Examiner* — Joseph Rocca
*Assistant Examiner* — Michael Stabley
(74) *Attorney, Agent, or Firm* — Stevens & Showalter, LLP

(57) ABSTRACT

A system for providing an electrical steering assist for a materials handling vehicle includes a drive housing; a steerable wheel coupled to the drive housing; a steering arm pivotally mounted to the drive housing; a steer drive unit coupled to the steerable wheel; an input sensing device; and a controller. The steering arm is operatively configured to determine a steering direction of the steerable wheel. The input sensing device is arranged to detect a turning force applied to the steering arm by an operator, wherein the turning force is provided to change the angle of travel of the vehicle. The input sensing device includes a strain measuring assembly defining a strain sensitive region between the steering arm and the steer drive unit. The controller is operatively configured to control the steer drive unit to turn the steerable wheel based upon a signal from the input sensing device.

27 Claims, 14 Drawing Sheets

(51) Int. Cl.
*B62D 6/10* (2006.01)
*B66F 9/075* (2006.01)

(56) References Cited

U.S. PATENT DOCUMENTS

| | | | |
|---|---|---|---|
| 3,168,157 A | 2/1965 | Ulinski |
| 3,557,893 A | 1/1971 | Kohls |
| 3,756,337 A | 9/1973 | Schroeder et al. |
| 4,077,486 A | 3/1978 | Blakeslee et al. |
| 4,137,984 A | 2/1979 | Jennings et al. |
| 4,155,417 A | 5/1979 | Ziems |
| 4,444,284 A | 4/1984 | Montemurro |
| 4,530,056 A | 7/1985 | MacKinnon et al. |
| 4,576,245 A | 3/1986 | Oldani |
| 4,598,797 A | 7/1986 | Schultz |
| 4,645,025 A | 2/1987 | Ohe et al. |
| 4,666,011 A | 5/1987 | Ohe et al. |
| 4,676,331 A | 6/1987 | Iwaki et al. |
| 4,685,528 A | 8/1987 | Suzuki et al. |
| 4,698,775 A | 10/1987 | Koch et al. |
| 4,700,802 A | 10/1987 | Fought |
| 4,714,140 A | 12/1987 | Hatton et al. |
| 4,828,066 A | 5/1989 | Hayashi |
| 4,836,319 A | 6/1989 | Haseda et al. |
| 4,873,475 A | 10/1989 | Togo et al. |
| 4,905,783 A | 3/1990 | Bober |
| 4,940,102 A | 7/1990 | Morishita |
| 5,032,999 A | 7/1991 | Finger et al. |
| 5,078,608 A | 1/1992 | Finlay |
| 5,128,598 A | 7/1992 | Avitan |
| 5,181,173 A | 1/1993 | Avitan |
| 5,225,753 A | 7/1993 | Koike et al. |
| 5,245,144 A | 9/1993 | Stammen |
| 5,265,686 A | 11/1993 | Machen |
| 5,279,242 A | 1/1994 | Johnson |
| 5,355,821 A | 10/1994 | Johnson |
| 5,375,673 A | 12/1994 | McCall et al. |
| 5,439,401 A | 8/1995 | Clark |
| 5,453,030 A | 9/1995 | Broussard |
| 5,522,471 A | 6/1996 | Hilgendorf |
| 5,579,863 A | 12/1996 | Nelson et al. |
| 5,778,327 A | 7/1998 | Simmons et al. |
| 5,810,104 A | 9/1998 | Campbell |
| 5,893,430 A | 4/1999 | Koike |
| 5,921,344 A | 7/1999 | Boyer |
| 5,924,518 A | 7/1999 | D'Onofrio |
| 5,964,313 A | 10/1999 | Guy |
| 6,082,212 A | 7/2000 | Bergman et al. |
| 6,107,716 A | 8/2000 | Penketh |
| 6,179,082 B1 | 1/2001 | Ikari |
| 6,227,320 B1 | 5/2001 | Eggert et al. |
| D445,553 S | 7/2001 | Pulskamp et al. |
| 6,260,646 B1 | 7/2001 | Fernandez et al. |
| 6,266,591 B1 | 7/2001 | Wilson-Jones et al. |
| 6,276,219 B1 | 8/2001 | Kube et al. |
| 6,276,485 B1 | 8/2001 | Eriksson et al. |
| 6,290,010 B1 | 9/2001 | Roudet et al. |
| 6,338,015 B1 | 1/2002 | Kawagoe et al. |
| 6,445,984 B1 | 9/2002 | Kellogg |
| 6,464,025 B1 | 10/2002 | Koeper et al. |
| 6,481,525 B1 | 11/2002 | Bloch et al. |
| 6,513,620 B2 | 2/2003 | Igawa et al. |
| 6,580,990 B2 | 6/2003 | Wager et al. |
| 6,659,208 B2 | 12/2003 | Gaffney et al. |
| 6,776,249 B2 | 8/2004 | Fortin |
| 7,017,689 B2 | 3/2006 | Gilliland et al. |
| 8,467,937 B2 | 6/2013 | Hanna et al. |
| 8,504,241 B2 | 8/2013 | Hanna et al. |
| 2001/0023383 A1 | 9/2001 | Ishihara et al. |
| 2001/0030075 A1 | 10/2001 | Furumi et al. |
| 2001/0037909 A1 | 11/2001 | Schafert |
| 2002/0000341 A1 | 1/2002 | Lorenz |
| 2002/0117349 A1 | 8/2002 | Wilson-Jones |
| 2003/0029647 A1 | 2/2003 | Trego et al. |
| 2003/0029648 A1 | 2/2003 | Trego et al. |
| 2003/0047374 A1 | 3/2003 | Peppler et al. |

FOREIGN PATENT DOCUMENTS

| | | |
|---|---|---|
| EP | 0900719 A1 | 10/1999 |
| EP | 1772344 A2 | 4/2007 |
| GB | 2230749 A | 10/1990 |
| JP | 53087473 | 8/1978 |
| JP | 1196606 A | 8/1989 |
| JP | 2243499 A | 9/1990 |
| JP | 9124291 A | 5/1997 |
| JP | 2002104800 A | 4/2002 |

OTHER PUBLICATIONS

Janusch, Stefan; International Search Report and Written Opinion of the International Searching Authority; International Application No. PCT/US2014/025590; Jul. 21, 2014; European Patent Office; Rijswijk, Netherlands.

Manual of Installation of Prototype Power Steering Pallet Truck for Field Evaluation; Oct. 7, 1991.

Super Valu Stores, Inc.; User Agreement for Field Evaluation of Prototype Trucks with Power Steering; Jul. 17, 1991; New Bremen, OH.

Wetterau Food Distribution Group; User Agreement for Field Evaluation of Prototype Trucks with Power Steering; Jun. 4, 1991; New Bremen, OH.

Spartan Stores Inc.; User Agreement for Field Evaluation of Prototype Trucks with Power Steering; May 15, 1991; New Bremen, OH.

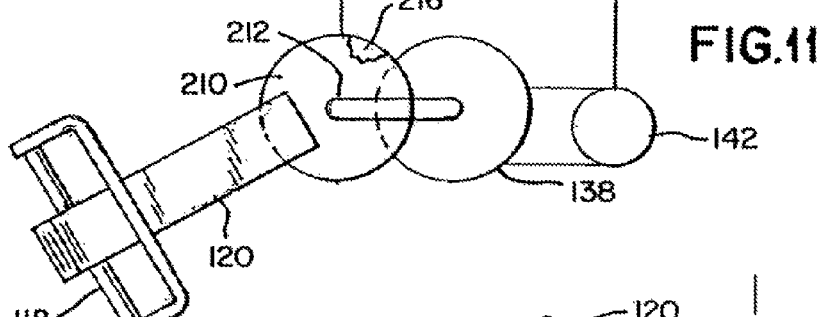
FIG. 11
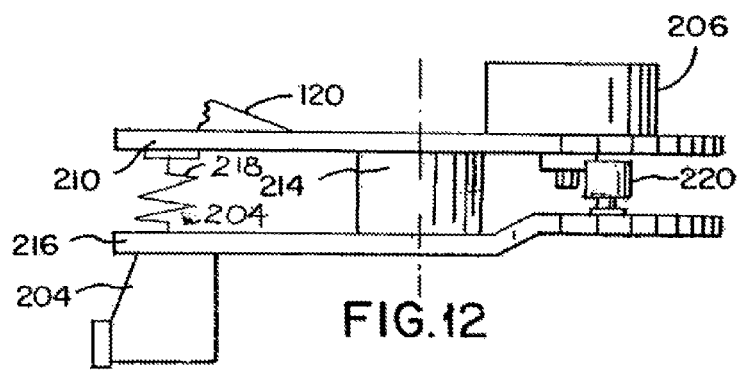
FIG. 12
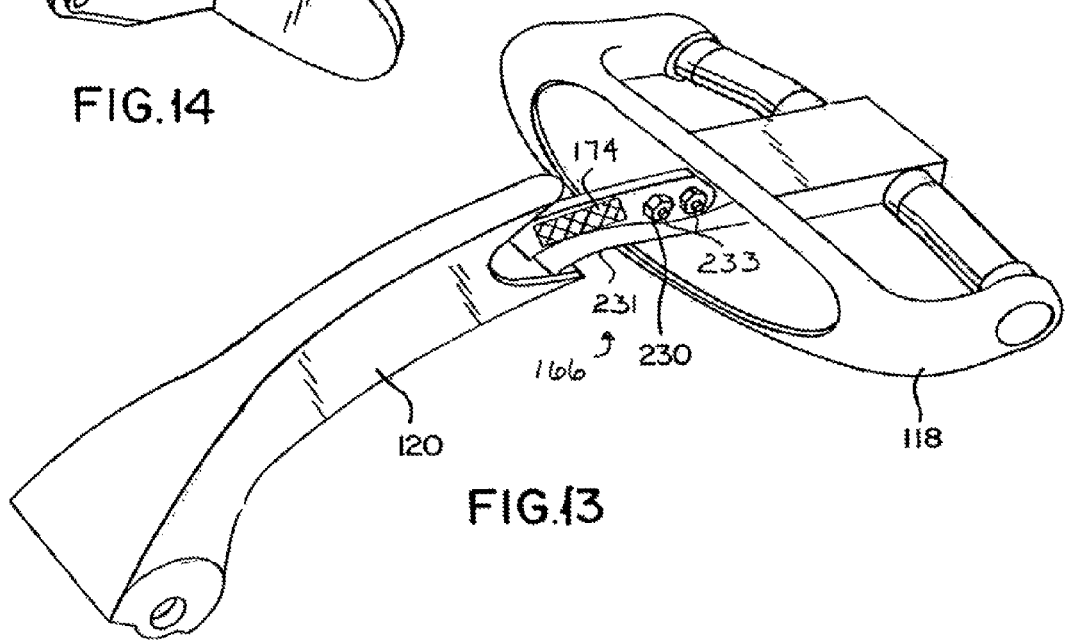
FIG. 14
FIG. 13

ELECTRICAL STEERING ASSIST FEATURES FOR MATERIALS HANDLING VEHICLES

CROSS REFERENCE TO RELATED APPLICATION

This application claims the benefit of U.S. Provisional Patent Application Ser. No. 61/783,329, filed Mar. 14, 2013 entitled "ELECTRICAL STEERING ASSIST FEATURES FOR MATERIALS HANDLING VEHICLES", the entire disclosure of which is hereby incorporated by reference herein.

BACKGROUND OF THE INVENTION

The present invention relates in general to materials handling vehicles such as walkie/rider pallet trucks commonly used for picking stock in large warehouses and, more particularly, to systems and methods for providing steering assistance on such vehicles.

A walkie/rider pallet truck includes generally, a set of load carrying forks, a power unit having at least one motor to power the truck, a steerable wheel and corresponding steering control mechanism to effect the direction of travel of the truck when in motion, and a platform onto which an operator may step and ride while controlling the truck. The steering control mechanism normally includes a movable steering arm, referred to as a tiller handle, which is mechanically coupled to the steerable wheel. The tiller handle includes the operational controls necessary for operating the truck, such as controls for raising and lowering the forks and rotatable twist grips or comparable devices for controlling the speed and direction (forward or reverse) of the truck.

To drive the truck, the operator steps onto the platform and grasps the handle, moving the steering arm into a truck operating range of positions between a generally vertical (up) braking position and a generally horizontal (down) braking position. The operator then actuates the appropriate controls to select a direction (if necessary) and twists one of the rotatable twist grips to accelerate the truck. Steering is effected by transitioning the tiller handle side to side in a generally horizontal plane. If the operator releases the handle, a deadman brake mechanism forces the arm to the up braking position, which actuates a spring-loaded brake to stop the truck. The operator can also actuate the brake manually by moving the steering arm to either of the up or down braking positions. Thus, the walkie/rider pallet truck may be in either a braking or non-braking mode, depending on the position of the steering arm within specified braking and operating arcs.

Due to the mechanical coupling arrangement of the steering arm to the steerable wheel, the steering force required to turn the truck varies during operation. When the truck is traveling, especially at relatively higher speeds, the steering force required by an operator to turn the truck is relatively low. However, a considerable amount of steering force is required to turn the steerable wheel when the truck is either at a standstill or traveling at slow speeds. In addition to the speed of the truck, the required steering force depends upon a number of other factors including, for example, the type and condition of the floor, the length of the forks, the load on the forks, and the tire type. As an example, given a typical material handling truck with 96 inch (2.44 meter) long forks and a poly drive tire, such as is used in many warehouse picking applications, the torque required to turn the steerable wheel of a stationary truck may vary from about 100 lbf-ft (135 N m) for no load conditions, to over 400 lbf-ft (542 N m) for loads of 8,000 Lbs. (3,629 kg.) when operating on a brushed concrete floor. The torque required to turn the steerable wheel of a stationary truck on smooth concrete can range from about 75 lbf-ft (102 N) for no load conditions up to about 300 lbf-ft (407 N) for loads of 8000 Lb. (3,629 kg).

The above-described exemplary steering torque requirements assume that the truck is not moving. The lowest force required to turn the tiller handle typically occurs when the tiller handle is positioned in a normal operating position, e.g., 2 ft (61 cm) from the centerline of the steerable wheel when the handle is in a horizontal position. However, as the handle is moved into a more vertical position, such as when turning in tight spaces, the radius of the arc defined by the handle with respect to the steerable wheel becomes much smaller, which results in increasing the required turning force. Accordingly, an operator operating a truck for a full day may become tired, which may cause productivity issues.

SUMMARY OF THE INVENTION

In accordance with a first aspect of the present invention, a system is provided for providing an electrical steering assist for a materials handling vehicle. The system comprises a drive housing; a steerable wheel coupled to the drive housing; a steering arm pivotally mounted to the drive housing; a steer drive unit coupled to the steerable wheel; an input sensing device; and a controller. The steering arm is operatively configured to determine a steering direction of the steerable wheel by moving the steering arm from side to side in a generally horizontal plane. The input sensing device is arranged to detect a turning force applied to the steering arm by an operator, wherein the turning force is provided to change the angle of travel of the vehicle. The input sensing device comprises a strain measuring assembly defining a strain sensitive region between the steering arm and the steer drive unit. The controller is operatively configured to control the steer drive unit to turn the steerable wheel based upon a signal from the input sensing device.

The strain measuring assembly may comprise an upper plate coupled to the steering arm and a lower plate spaced from the upper plate and coupled to a drive unit of a drive assembly of the vehicle, the drive unit being coupled to the steer drive unit. The upper and lower plates may be coupled together via a bearing that allows for a small amount of relative rotational movement between the upper and lower plates. The strain measuring assembly may further comprise a load cell sensor arranged to output a signal that corresponds to a measure of the force applied to the steering arm. The load cell sensor may comprise a bending beam style sensor with a first end mechanically coupled to the upper plate and a second end mechanically coupled to the lower plate. The first end of the load cell sensor may be directly affixed to an upper surface of the upper plate, and the second end of the load cell sensor may be coupled to a shaft that is coupled to the lower plate and extends from the lower plate through an oversized aperture formed in the upper plate. The load cell sensor may comprise first and second strain gauge sensors located at different locations on a metal beam of the load cell sensor, wherein the first and second strain gauge sensors sense flexure in the metal beam that results from relative rotational movement between the upper and lower plates. The first and second strain gauge sensors may send respective strain measurement signals of the sensed flexure in the metal beam to the controller, wherein the controller processes the strain measurement signals and generates a corresponding control signal that is supplied to the steer drive unit to provide steering assist to the steering arm based upon a level of force detected by the load cell sensor. If the signals sent by the first and second strain gauge sensors to the controller are not substantially identical, the controller may implement a response routine, which may comprise one or more of: implementing a vehicle stop or slowing action, sending an alert to the operator, or dynamically switching steering assist control from one of the first and second strain gauge sensors to the other.

The controller may be operatively configured to vary an amount of steering assist provided to the steering arm by the steer drive unit based upon a level of force detected by the input sensing device.

A coupling between the steering arm and the strain measuring assembly may allow for vertical pivoting movement of the steering arm relative to the strain measuring assembly, wherein such pivoting movement of the steering arm is used to move the steering arm into braking and operating arcs.

In accordance with a second aspect of the present invention, a system is provided for providing an electrical steering assist for a materials handling vehicle. The system comprises a drive housing; a steerable wheel coupled to the drive housing; a steering arm pivotally mounted to the drive housing; a steer drive unit coupled to the steerable wheel; an input sensing device; and a controller. The steering arm is operatively configured to determine a steering direction of the steerable wheel by moving the steering arm from side to side in a generally horizontal plane. The input sensing device is arranged to detect a turning force applied to the steering arm by an operator, wherein the turning force is provided to change the angle of travel of the vehicle. The input sensing device comprises a strain measuring assembly defining a strain sensitive region between the steering arm and the steer drive unit. The strain measuring assembly comprises spaced apart upper and lower plates, wherein the upper and lower plates are coupled together such that a small amount of relative rotational movement is permitted between the upper and lower plates. The controller is operatively configured to control the steer drive unit to turn the steerable wheel based upon a signal from the input sensing device and to vary an amount of steering assist provided to the steering arm by the steer drive unit based upon a level of force detected by the input sensing device.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals, and in which:

FIG. 11 is a schematic diagram of a loss motion sensor according to an embodiment of the present invention;

FIG. 12 is a side view of the loss motion device shown in FIG. 11 illustrating the orientation of the loss motion sensor;

FIG. 13 is a perspective view of a steering arm and a handle according to an embodiment of the present invention;

FIG. 14 is a perspective view of a cap that may be provided to cover a portion of the steering arm and handle illustrated in FIG. 13;

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
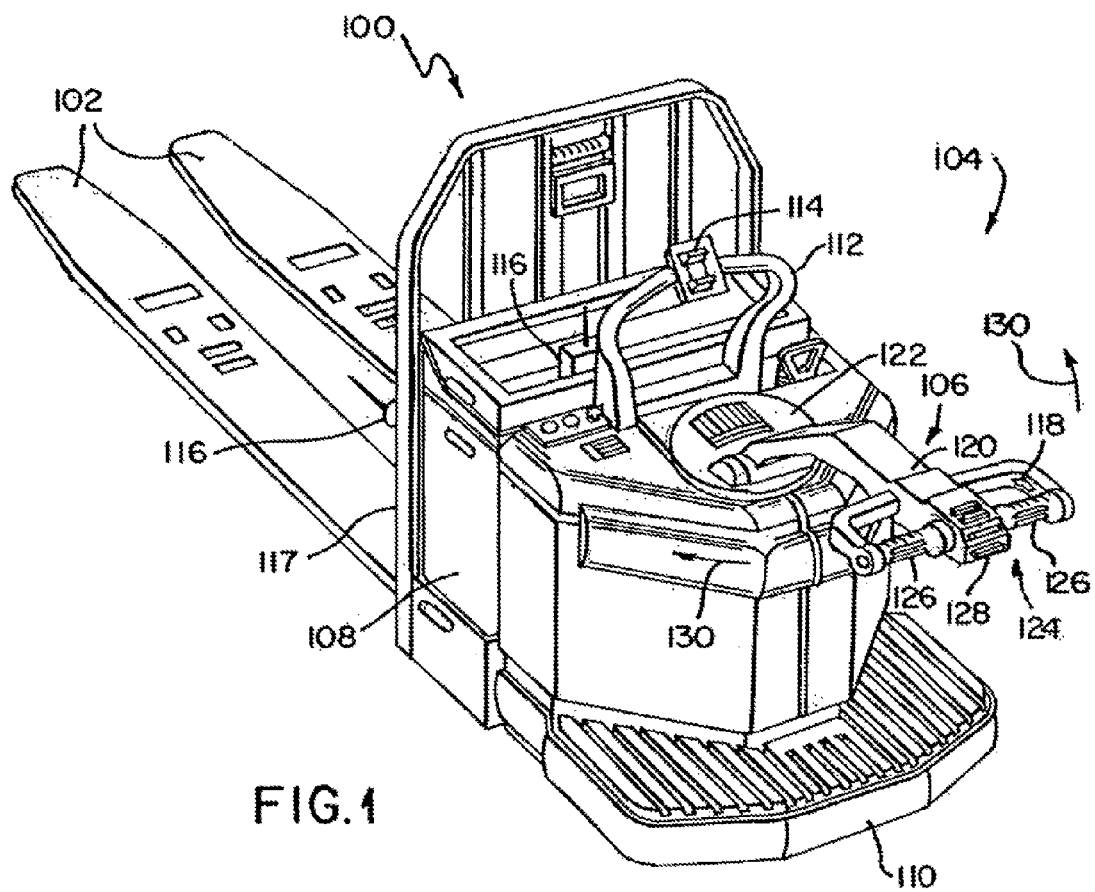
FIG. 1 is a perspective view of a materials handling vehicle according to various embodiments of the present invention.

Referring initially to FIG. 1, a walkie/rider pallet truck 100 includes load carrying forks 102 that extend rearwardly from a power unit 104. The power unit 104 includes a steering control unit 106, a steerable wheel (139, see FIG. 5) that is usually located beneath the steering control unit 106 and is steered thereby, an electric traction motor (not shown) for driving the steerable wheel, and a battery compartment 108 for holding one or more batteries that supply electrical power to the truck. The power unit 104 also includes a platform 110 onto which an operator may step and ride while controlling the truck 100. A grab bar 112 projects from the power unit 104 and provides a grip for an operator while riding on the platform 110. The grab bar 112 includes a control panel 114 mounted thereon, which provides operational controls such as a coast switch, a high speed/coast release switch (HS/CR), a horn switch and/or switches for raising and lowering the forks. A joystick 116 and other operational controls for advancing the truck forwards or backwards may also optionally be positioned on one or both sides of a load backrest 117. The joystick 116 and other operational controls may also/alternatively be provided on the control panel 114 or other operator accessible location.

The steering control unit 106 includes a handle 118 that is mounted to a first end portion of a steering arm 120. The steering arm 120 is further pivotally mounted at a second end portion, to a steerable wheel drive housing 122. The operator uses the handle 118 to control steering, braking and other truck functions. Accordingly, the handle 118 includes operator controls 124, such as twist grips 126 for controlling the direction (forward and reverse) and speed of the truck, and may include one or more switches 128 for performing functions such as reversing truck direction, raising and lowering the forks 102, and sounding a horn.

Figure 2:
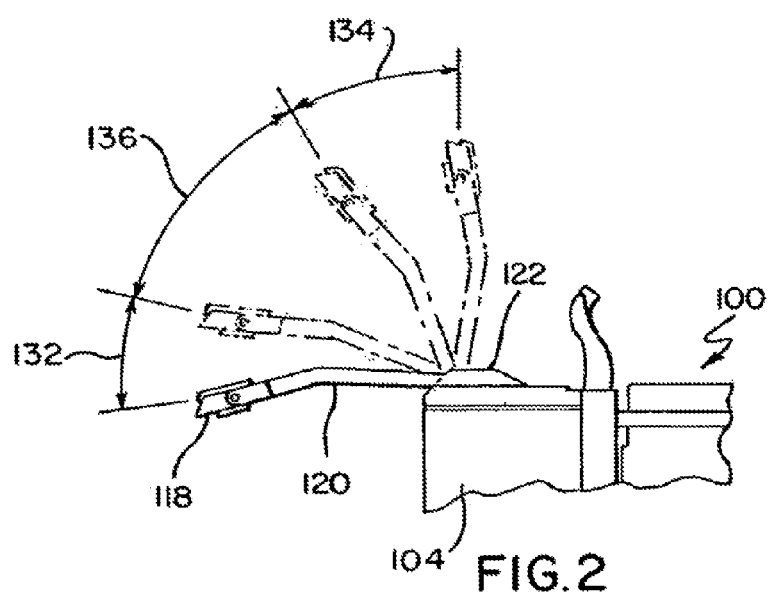
FIG. 2 is a schematic illustration showing a partial side view of the materials handling vehicle of FIG. 1, illustrating the range of vertical travel of the steering arm and the relative operative states when the steering arm is in such positions.

The steering arm 120 pivots about the steerable wheel drive housing 122 to enable operative control of the truck. Moving the steering arm 120 from side to side in a generally horizontal plane as illustrated by directional arrows 130 determines the steered direction of the truck 100. Referring to FIG. 2, braking the truck 100 may be accomplished by moving the steering arm 120 to a generally horizontal (down) braking position within a horizontal braking arc 132. Braking may alternatively be accomplished by moving the steering arm 120 to a generally vertical (up) braking position within a vertical braking arc 134. To drive the truck 100, the steering arm 120 is moved to a position within an operating arc 136 interposed between the horizontal and vertical braking arcs 132, 134.

Referring back to FIG. 1 briefly, the twist grips 126 are spring biased to a center neutral position. Rotating either of the grips 126 forward will cause the truck 100 to move forward at a speed proportional to the amount of rotation of the grips 126. Similarly, rotating either of the grips 126 toward the rear of the truck 100 will cause the truck 100 to move in reverse at a speed proportional to the amount of rotation of the grips 126.

Steering Assistance for Materials Handling Vehicles

Figure 3:
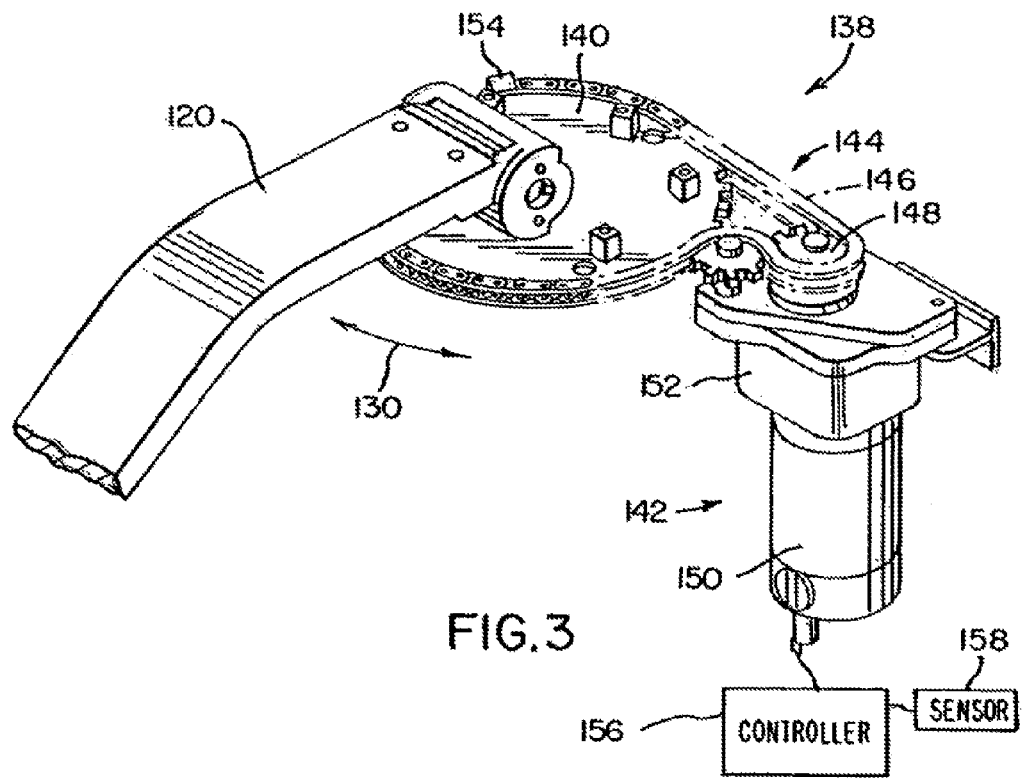
FIG. 3 is a partial perspective view of a drive assembly according to an embodiment of the present invention.

Referring to FIG. 3, the steering arm 120 is mechanically coupled to the steerable wheel (139, see FIG. 5) via a drive assembly 138. The drive assembly 138 includes a drive plate 140 coupled to a steer drive unit 142 by a drive linkage 144. As shown, the drive linkage 144 comprises a chain drive 146 that extends about at least a portion of the drive plate 140 and engages a sprocket 148 coupled to the steer drive unit 142. The drive unit 142 comprises a steer motor 150 and a corresponding gearbox 152. For example, in one working embodiment, a Bodine model 42A7BEPM CG permanent magnet (PM) motor with integral gearbox having a 71.1:1 gearbox ratio was used. A brushless d.c. (BLDC), induction, switched reluctance, or any other type motor having suitable performance could alternatively be used for the motor 150. Also, an optional clutch may be provided between the motor 150 and the drive plate 140. It is noted that the chain drive ratio should be matched with the gearbox ratio and the motor speed based upon a desired rotational speed and torque. For example, the chain drive 146 used with the above Bodine PM motor had a ratio of 3.5:1 in a working embodiment of the present invention.

A chain slack take up device 154 may also be provided to prevent backlash which could cause instability in the drive assembly 138. For example, the chain slack take up device 154 may comprise a compression spring configured to provide tension to one end of the chain drive 146. Alternatively, the chain slack take up device 154 may comprise a spring loaded sprocket (not shown) to provide suitable tensioning. While a chain drive 146 is illustrated, a gear drive, belt drive or other linkage could alternatively be used to operatively link the drive plate 140 to the steer drive unit 142. Regardless of the particular linkage, however, rotation of the steering arm 120 in a horizontal plane, as indicated by the directional arrow 130, causes the steerable wheel 139 to turn by the combination of a mechanical coupling between the steering arm 120 and the drive plate 140, and the electrical steering assistance provided by the steer drive unit 142 via the drive linkage 144. By "mechanical coupling", it is meant that a first member physically contacts a second member directly, or via one or more physically connected intermediate members. For example, the steering arm 120 physically contacts the drive plate 140 as shown, however, one or more physically connected intermediate members may alternatively be used to link the steering arm 120 to the drive plate 140.

The motor 150 provides a steering assistance force to reduce the manual force required to steer the truck 100, especially when the truck 100 is stationary or traveling at low speeds. The amount of steering assistance is determined by a controller 156 that receives inputs from one or more sensing devices 158 that provide operator input commands. The particular implementation of the controller 156 will vary based upon the type of signal conditioning and processing required, the number and type of inputs into the system, and the type of motor used. An exemplary controller may be a servo amplifier such as model 120A10 from Advance Motion Controls. The Advance Motion Controls servo amplifier allows the gain of the servo amplifier to be adjusted, it can be used in a current, voltage, or velocity mode, and also has IR compensation, an analog position loop, and full quadrant regenerative operation making it a flexible servo amplifier for steer assist control applications.

Figure 4:
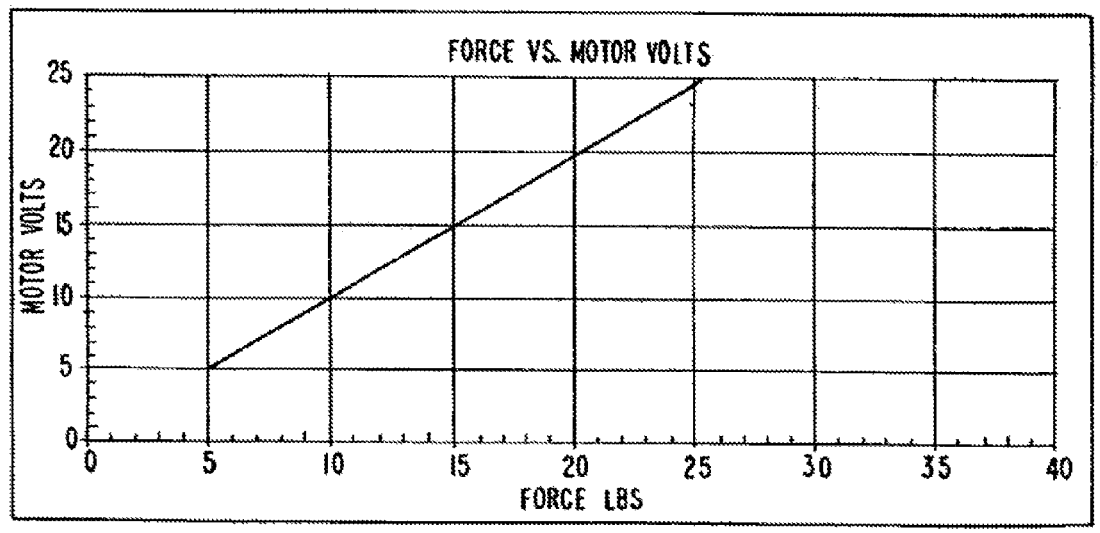
FIG. 4 is a graph illustrating an exemplary operator applied force vs. motor voltage curve for an electrical steering assist according to an embodiment of the present invention.

The controller 156 is configured to operate along a predefined curve that defines the steer assistance (e.g., expressed as a motor control voltage) as a function of operator provided turning force. As one example, a target value for the steering effort was set to approximately 25 pound (111.2 Newton). Accordingly, the controller 156 was configured to output the maximum intended motor control voltage when the input force from the sensing device(s) 158 reaches 25 Lbs of force (111.2 Newton). FIG. 4 illustrates an exemplary motor control voltage versus operator provided turning force curve for the above described design parameters. The steer motor control signal generated by the controller 156 need not vary linearly with the magnitude of the measured force from the sensing device(s) 158 as illustrated. Rather, any number of functions can be implemented by the controller 156 based upon desired steer assistance characteristics. Also, the function of steer assistance to operator applied turning force can be made variable based upon a number of factors including operator preference, truck load, speed, truck travel direction (forward or backward), or other operating conditions as will be described more fully herein.

Power Assist with Force Device

Figure 5:
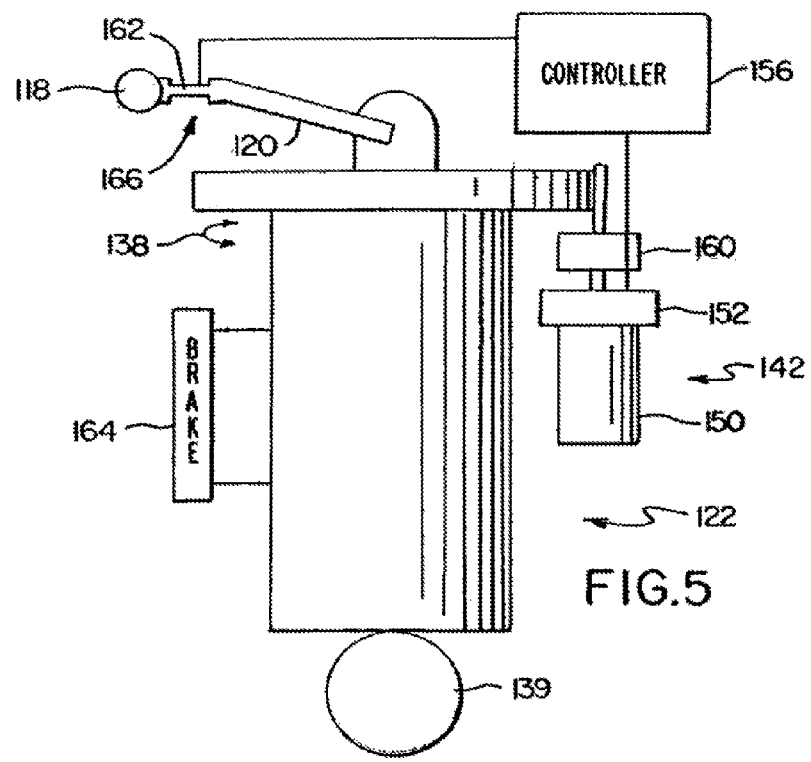
FIG. 5 is a basic schematic diagram of an electrical steering assist system where a steering arm is mechanically coupled to a steerable wheel and the amount of steering assist is derived from a force measurement.

According to an embodiment of the present invention illustrated in the basic schematic system diagram of FIG. 5, electrical steering assistance is provided based upon measurements from a force sensing device. The steering arm 120 is mechanically coupled to the steerable wheel 139 via the drive assembly 138. The drive assembly 138, as shown, includes the steer motor 150, gearbox 152 and an optional clutch 160 as described more fully herein. The sensor 158 shown in FIG. 3 is implemented as one or more force sensing devices 162 on the handle 118, the steering arm 120 (as shown) and/or the drive assembly 138 to measure the force that the operator applies to the handle 118. The sensed force is communicated to the controller 156 to control the steer motor 150 accordingly. The magnitude of the force detected from the force sensing device(s) 162 is used to adjust the voltage applied to the steer motor 150. The voltage applied to the steer motor 150 correspondingly defines the amount of steering assist provided by the system.

Notably, the steering arm 120 is mechanically linked to the drive assembly 138. Accordingly, the operator of the truck 100 may steer and brake without electrical power available to the truck, or without the steering assistance engaged or operable. An optional brake 164 may further be provided. The brake 164 is operatively configured to be operable to stop the truck 100 independent of power available to the truck, and may be provided as a backup to other truck braking systems.

The force sensing device(s) 162 are positioned in a manner such that a force signal can be generated that is suitable for processing by the controller 156. For example, the force sensing device(s) 162, such as a strain gauge(s), can be configured to provide a strain measurement in the handle 118 and/or steering arm 120. Stress may be measured at the connection point of the handle 118 to the steering arm 120, and if the handle 118 pivots with respect to the steering arm 120, strain may alternatively be measured at the corresponding pivot point. Similarly, where a twist grip 126 or similar operative control is provided on the handle 118, stress can be measured in the connection points, e.g., bolts of the twist grip 126 to the handle 118. Still further, the stress can be measured at the point in which the steering arm 120 couples to the drive assembly 138, e.g., in a pin that allows the steering arm 120 to pivot with respect to the drive housing 122.

As illustrated, strain is measured along the steering arm 120, e.g., using conventional strain gauges or other force measuring sensors. However, depending upon the particular implementation, it may be that the steering arm 120 will not deflect a sufficient amount to provide a signal suitable for processing. For example, the steering arm 120 may comprise an aluminum casting with a box-shaped cross section designed to withstand the force of hitting another structure, such as may be expected in warehousing operations. Thus, it may be that measurable stress in the steering arm 120 during normal steering would be very low and present difficulty in accurately measuring with conventional strain gauges.

Figure 6:
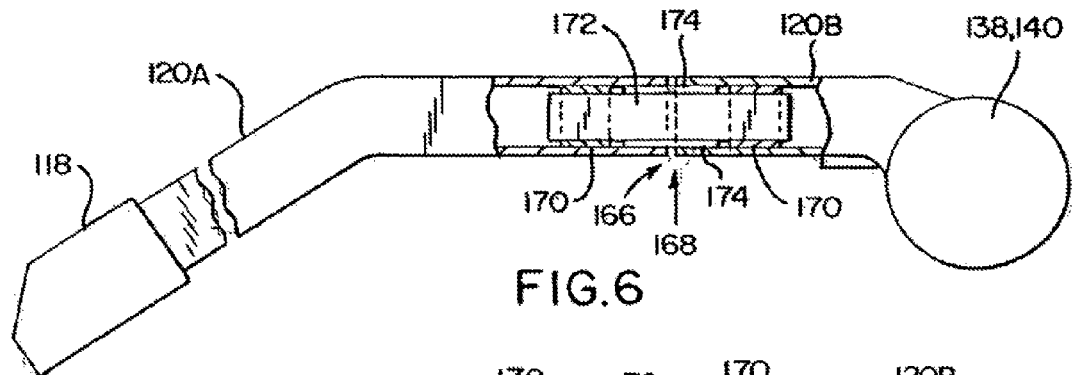
FIG. 6 is a sectional view of the side of a two-piece steering arm according to an embodiment of the present invention, where a portion of the side is cut away to illustrate a force sensor mounted therein.
Figure 7:
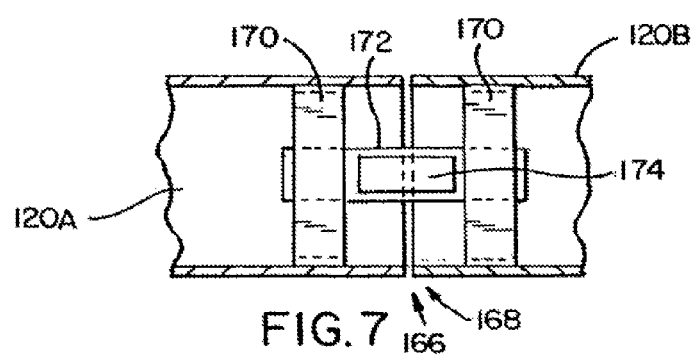
FIG. 7 is an exploded top view of the steering arm shown in FIG. 6, where a portion of the top of the steering arm is cut away to illustrate the force sensor mounted therein.

If it is impractical to directly measure stress along the steering arm 120, the steering arm 120 can be constructed with a strain sensitive region 166. The strain sensitive region 166 is an area incorporated into the steering arm 120, the coupling between the steering arm 120 and the handle 118, or the coupling between the steering arm 120 and the drive assembly 138 that allows sufficient deflection to enable the use of a desired strain gauge, while retaining the strength of the steering arm 120. As an example, the steering arm 120 shown in FIGS. 6 and 7 is provided as a two piece assembly comprising an upper arm 120A connected to a lower arm 120B by a strain measuring assembly 168. The area where the upper and lower arms 120A, 120B are joined defines the strain sensitive region 166.

The connection of the upper arm 120A to the lower arm 120B can be positioned anywhere along the length of the steering arm 120. However, positioning the connection of the upper arm 120A to the lower arm 120B closer to the drive assembly 138 will likely provide greater sensitivity for the strain measuring assembly 168 relative to a position closer to the handle 118. As shown, the strain measuring assembly 168 includes an anchor 170 in each of the upper and lower arms 120A, 120B. A connecting member 172, e.g., a hollow tube is rigidly secured between the anchors 170, for example by using welds, and one or more strain gauges 174 are bonded or otherwise secured to the connecting member 172. The strain measuring assembly 168 is further secured, e.g., bolted, to each of the upper and lower arms 120A, 120B. As shown, there are two strain gauges 174, one on each side of the connecting member 172. Exemplary strain gauges suitable for the above strain measuring assembly 168 include the CEA-series of gauges manufactured by Vishay Intertechnology Inc.

Figure 8:
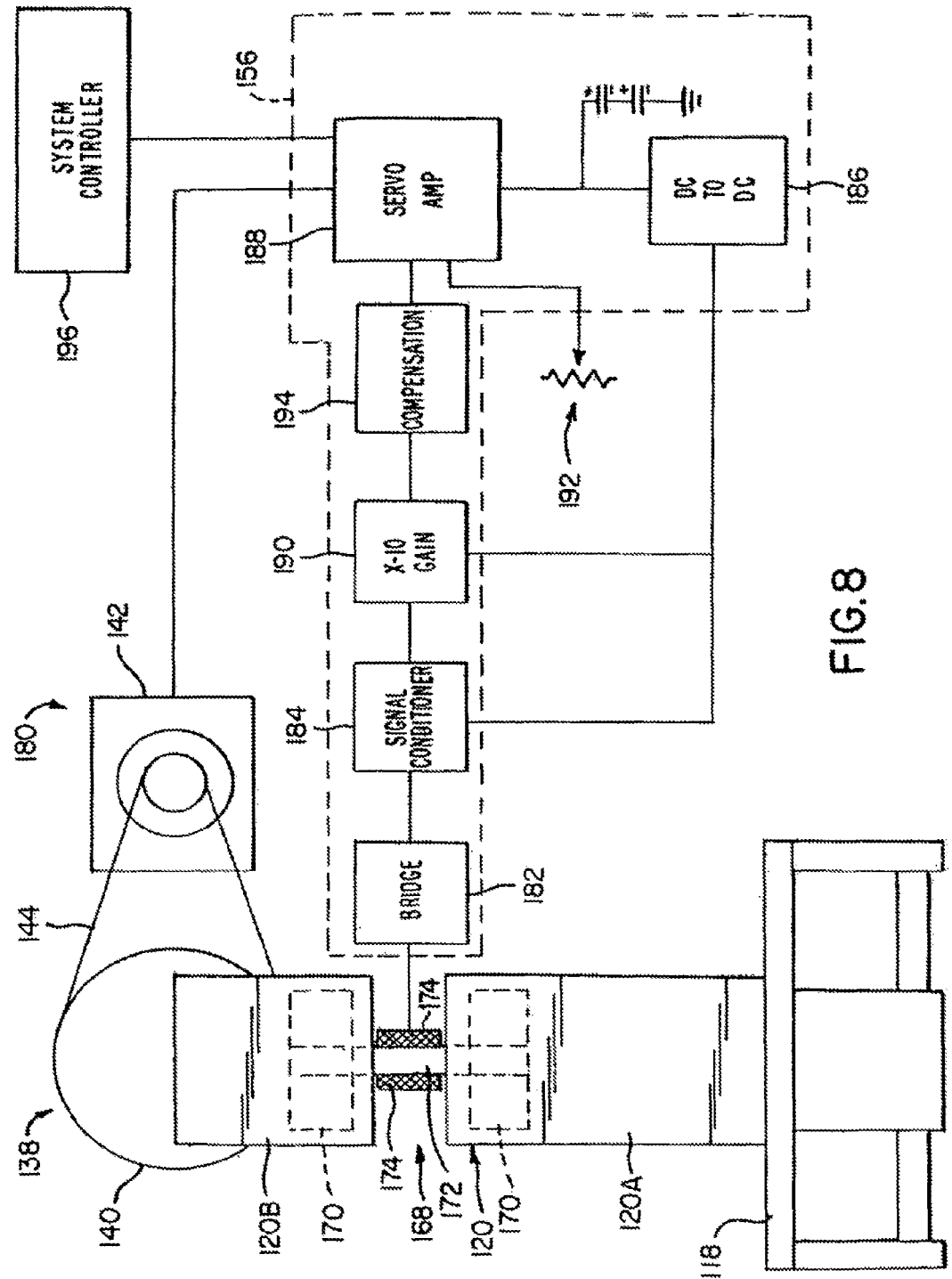
FIG. 8 is a schematic illustration of a force sensor mounted to a steering arm, and a corresponding controller for processing the force sensor output to derive a steer assistance motor control signal for controlling a motor to provide steer assistance.

A system 180 for processing strain gauge measurements is schematically illustrated in FIG. 8. As shown, the steering arm 120 comprises the upper arm 120A coupled to the lower arm 120B by the strain measuring assembly 168 as described above with reference to FIGS. 6 and 7. The lower arm 120B is mechanically coupled to the drive assembly 138 and the plate 140, and the drive plate 140 is coupled to the steer drive unit 142 via the linkage 144 as described in greater detail with reference to FIG. 3. As an operator applies force to the handle 118, the strain gauges 174 supply a strain measurement signal to the controller 156. The controller 156 processes the strain measurement signal and generates a corresponding control signal that is supplied to the steer drive unit 142 to provide steering assist.

The illustrated strain gauges 174 generate a resistance that varies with strain. Accordingly, the controller 156 includes a bridge completion module 182, a strain gauge input signal conditioner 184 and a power supply 186. The bridge completion module 182 provides a resistor bridge (Whetstone Bridge) to balance the strain gauges 174. An exemplary bridge completion module is the #MR1-350-130 by Vishay Micro Measurements. The signal conditioner 184 provides filtering, isolation and amplification to the signal received from the bridge completion module 182. An exemplary signal conditioner is the #DSCA 30-05 by Dataforth. The power supply 186 is provided to power the various components of the controller 156 and may also serve to excite the strain gauges 174 and the bridge completion module 182. The power supply may also optionally perform DC to DC voltage conversion. An exemplary power supply is the #PTK15-Q24-D12 by Vinfinity.

Figure 9:
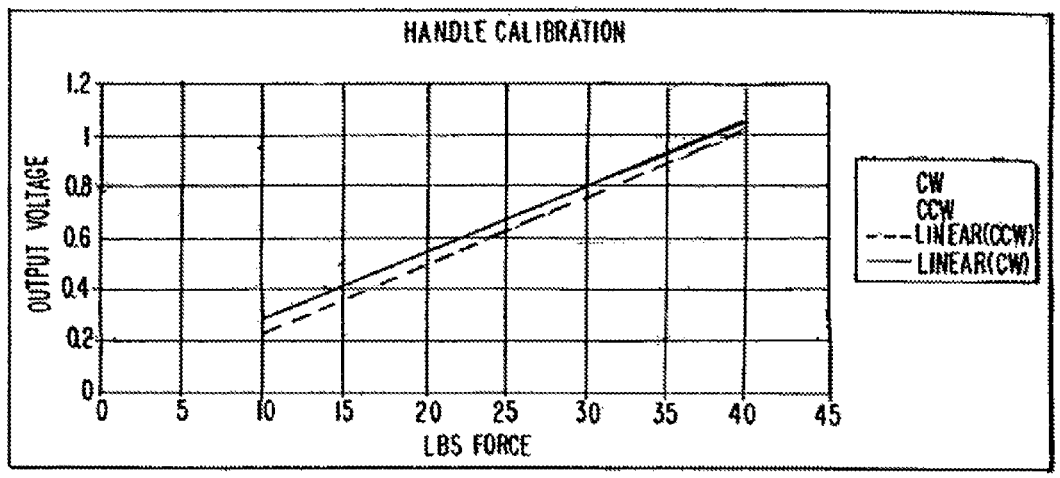
FIG. 9 is an exemplary graph of operator input force vs. voltage processed by the controller shown in FIG. 8.

The output of the signal conditioner 184 is coupled to a servo amplifier 188, e.g., a model #120A10C Servo Amplifier by Advance Motion Control. A system was constructed using the above described components and the output of the strain gauge signal conditioner 184 was measured with the result shown in FIG. 9. As illustrated, even at an input force of 40 Lbs. (178 Newton), the output voltage of the signal conditioner 184 is only just over one volt. Notably, the force plotted on the X-axis was applied at the twist grip 126 at right angles to the handle 118, which was oriented horizontally just above the lower braking position 132. Referring back to FIG. 8, to compensate for the relatively low output of the signal conditioner 184, an optional gain adjustment may be provided. For example, a 10X signal gain is provided by a signal scaling module 190, e.g., a model #DSCA31-01 by Dataforth. The gain of the scaling module 190 and the gain of the servo amplifier 188 can thus be suitably tuned to ensure a robust signal is presented to the servo amplifier 188 for processing. For example, in a working embodiment of FIG. 8, the above components of the controller 156 were adjusted to achieve full motor voltage with a 25 lbs. (111 Newton) force applied to the handle 118 at the twist grip 126, as illustrated in the force/motor voltage characteristics illustrated in FIG. 4.

In addition to the strain gauges 174, an optional secondary input sensing device 192, such as a potentiometer, may also be provided. Such an arrangement will be described in greater detail herein. It shall be appreciated however, that a separate control module may be required for the secondary input sensing device 192, depending upon the features provided by the controller 156, including the servo amplifier 188.

The controller 156 may also include a compensation circuit 194 for fine tuning the strain gauge signal output by the signal conditioner 184. For example, it may be desirable for the compensation circuit 194 to implement a lag/lead function to dampen the strain signal before application to the servo amplifier 188 to reduce the possibility that the controller 156 will oscillate. Ideally, the force applied to the force sensing assembly 168 only occurs in a horizontal (right-left) plane. However, it is contemplated that in practice, the handle 118 may be twisted, causing forces to be applied to the strain sensors along other axes. Accordingly, one or more compensation circuits 194 may be provided to implement functions that account for such conditions. The controller 156 may further communicate with a truck system controller 196 that is responsible for handling other functions of truck operation.

The strain sensitive region 166 may be positioned proximate to where the handle 118 couples to the steering arm 120 in lieu of, or in addition to, providing a strain sensitive region in the two-piece assembly steering arm 120A, 120B. As shown in FIG. 13, the handle 118 is coupled to the steering arm 120 by a connecting member 231. The connecting member 231 may further serve a function similar to the connecting member 172, i.e., for supporting one or more strain gauges 174. It is noted that accordingly, the system for processing strain gauge measurements discussed with reference to FIG. 8 may be analogously implemented with the strain gauge(s) shown in FIG. 13. An alternative sensing device 230 may also be provided about the connecting member 231 for sensing force. For example, the sensing device 230 may detect stress in the fasteners 233 that couple either the steering arm 120 to the connecting member 231, or in the handle 118 to the connecting member 231. It shall be noted that the strain gauge(s) 174 and/or the sensing device 230 correspond to the sensor 158 shown in FIG. 3. A boot 232, shown in FIG. 14, is provided to cover and protect the connecting member 231. The strain gauges 174 and/or sensing device 230 derive a control signal based upon detection of operator applied turning force to the handle 118 relative to the steering arm 120.

Power Assist with Loss Motion

Figure 10:
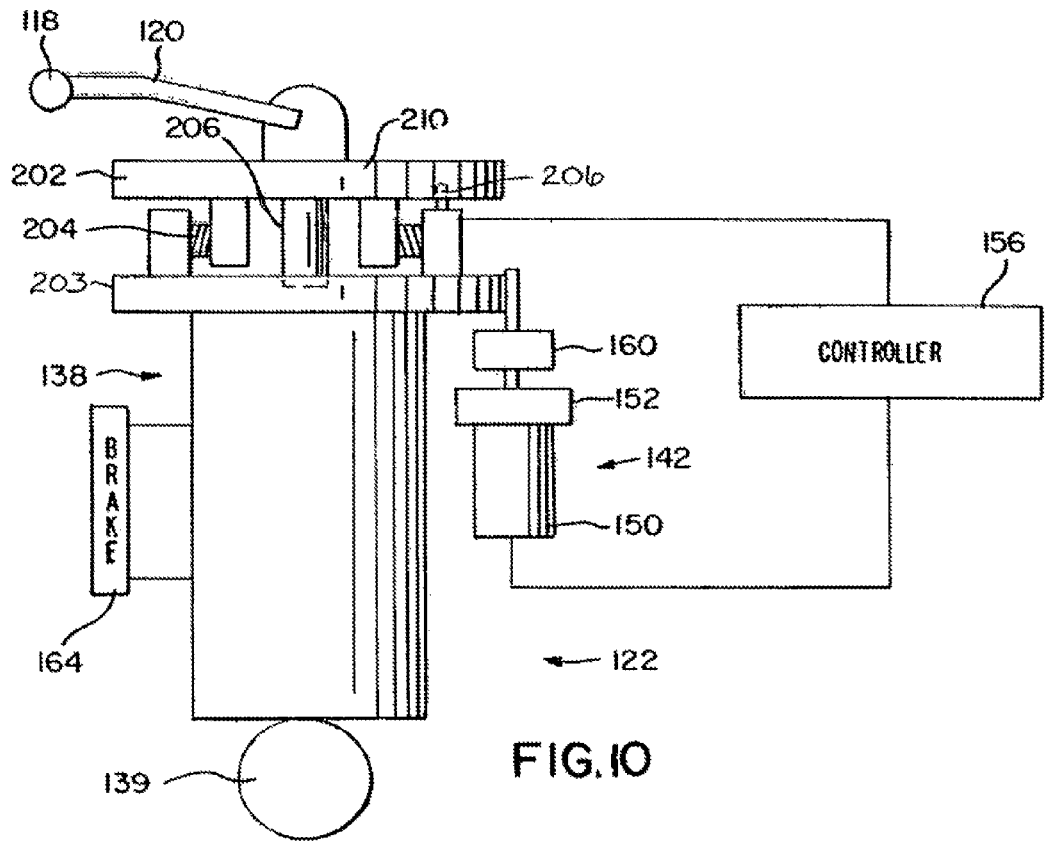
FIG. 10 is a basic schematic diagram of an electrical steering assist system where a steering arm is mechanically coupled to a steerable wheel and the amount of steering assist is derived from a loss motion sensor.

According to another embodiment of the present invention illustrated in FIG. 10, steer assistance is determined for a materials handling vehicle in a manner which is generally referred to herein as loss motion steer assist. In a loss motion system, a motion, e.g., pivoting, rotating or linear travel, of a first steering member is detected relative to a second steering member. For example, the steering arm 120 may be able to rotate independently of the drive assembly 138 up to a limit that is determined by mechanical stops. Once a stop is reached, the steering arm 120 may begin to perform work on the drive assembly 138 via mechanical coupling, i.e., the steering art 120 will begin to turn the drive assembly 138 as force is applied to the handle 118. As shown in the schematic diagram of FIG. 10, the steering arm 120 is fixedly mounted to a first steering member 202, e.g., a first drive plate. The first steering member 202 can move slightly relative to a second steering member 203, e.g., a second drive plate, which is mechanically coupled to the steerable wheel 139. A biasing mechanism 204, e.g., one or more springs, is provided as a bias to center the steering arm 120 and the handle 118 in line with the steerable wheel 139 when no force is applied to the handle 118. As the operator applies force to the handle 118, the biasing mechanism 204 also provides a corresponding steering resistance.

In the embodiment of FIG. 10, the sensor 158 of FIG. 3 is implemented as a motion sensor 206 that measures the displacement (linear or angular) between the first steering member 202 and a reference on the second steering member 203. That is, when the operator applies a turning force in one direction, e.g., when an operator applies force to the handle 118 either to the right or to the left, the first steering member 202 moves a small amount in the same direction as the operator's applied force. This displacement of the first steering member 202 relative to the second steering member 203 is measured by the sensor 206. The output of the sensor 206 is communicated to the controller 156, which may include signal conditioners, amplifiers and correction circuitry as described more fully above with reference to FIG. 8, and the controller 156 provides a suitable control signal to the steering motor 150 to provide a steering assist for the operator. In this embodiment, steering is retained irrespective of whether electrical power is available to the truck because the steering arm 120 is mechanically coupled to the steerable wheel 139. An optional brake 164 may also be provided to stop the truck 100 as described in greater detail above.

According to the embodiment illustrated by the schematic diagram of FIG. 11 and an associated exploded side view of FIG. 12, a loss motion steer assist comprises a steering arm 120 coupled to a top swivel plate 210, i.e., the first steering member. As best seen in FIG. 12, a bearing 214 or similar device is used to position the top swivel plate 210 on the same rotational center as a bottom plate 216, i.e., the second steering member. A linkage 212 mechanically couples the steering arm 120 to the steerable wheel 139 so that steering control is retained irrespective of whether electrical power is available to the truck 100. The steering arm 120 is centered by a spring mechanism 204 in a manner such as that described with reference to FIG. 10. The spring mechanism 204 may include one or more torsion springs 218 that provide a resistance to the force applied by the operator to steer the truck.

The sensor 158 shown in FIG. 3 is implemented as a motion sensor 206, e.g., an encoder, situated on the top swivel plate 210, which is in cooperation with a sensor module linkage 220 for measuring the displacement of the steering arm 120 by monitoring the change in position of the top swivel plate 210 relative to the bottom plate 216. The signal from the motion sensor 206 is output to the controller 156 that derives an appropriate motor control signal as described in greater detail herein. Moreover, the controller 156 may include a signal conditioner, gain adjustment, correction circuit and/or servo amp as described with reference to FIG. 8.

Figure 15:
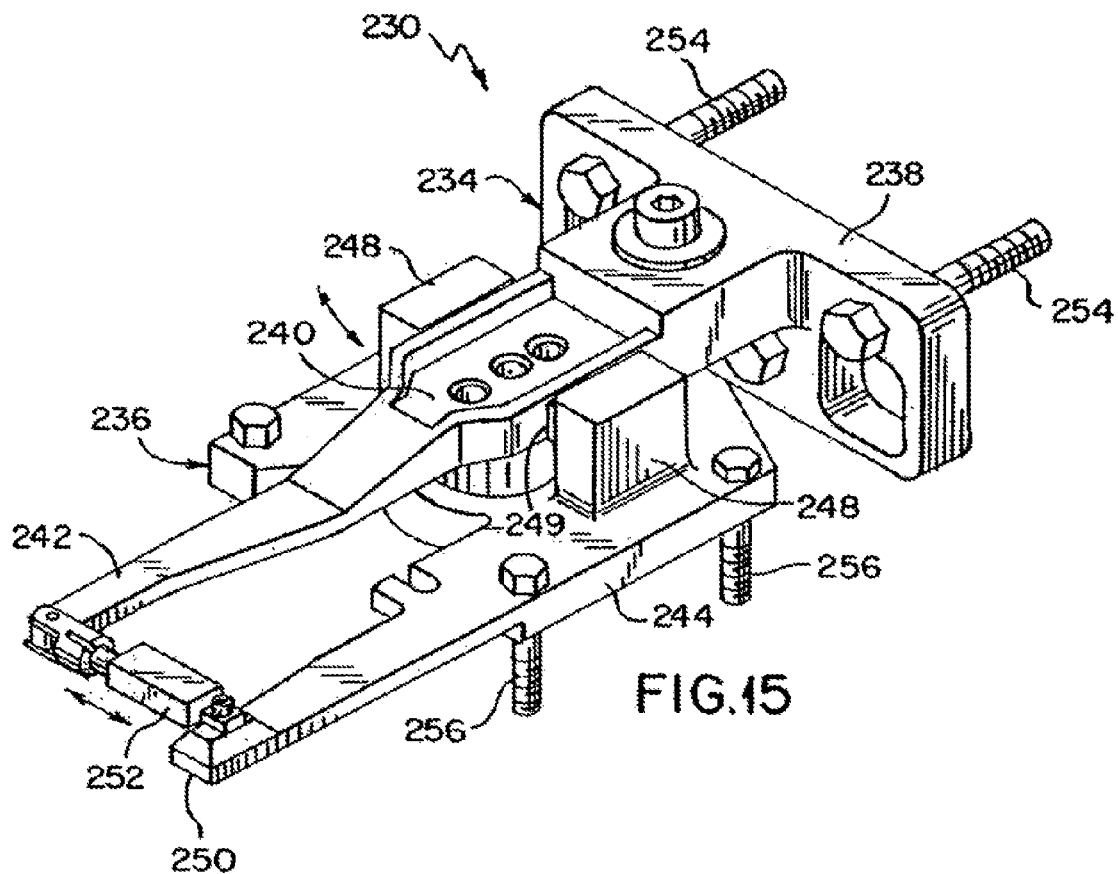
FIG. 15 is a perspective view of a loss motion device.
Figure 16:
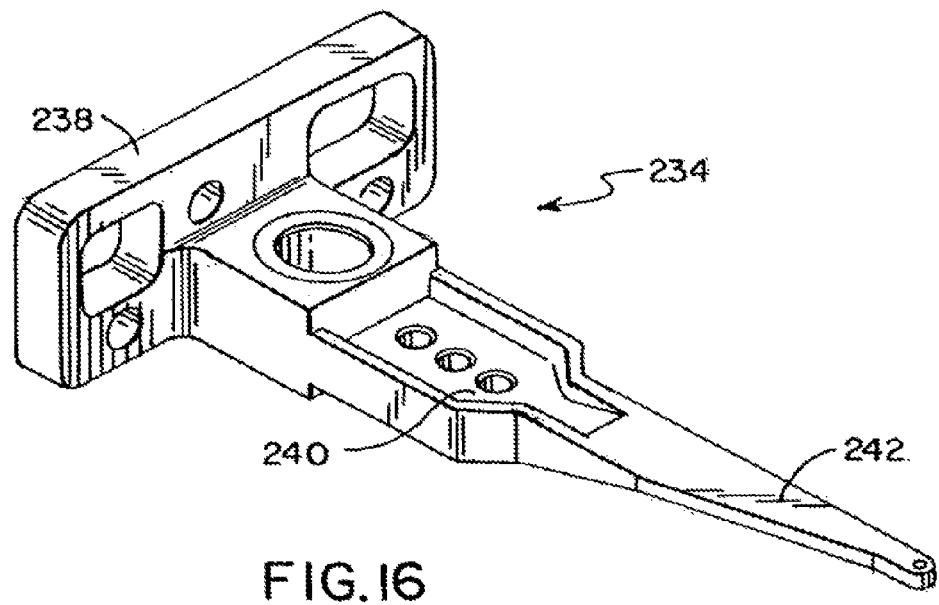
FIG. 16 is a perspective view of an upper member of the loss motion device shown in FIGS. 13 and 15.
Figure 17:
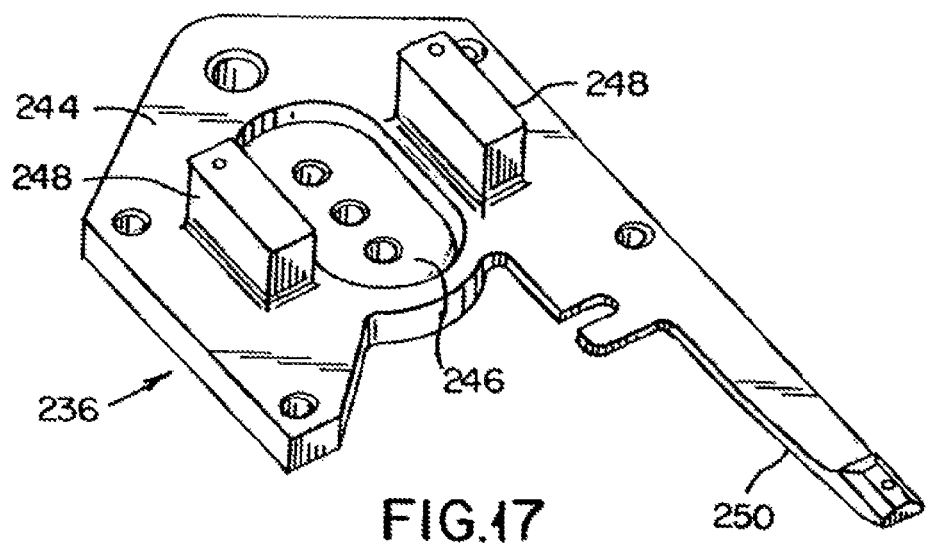
FIG. 17 is a perspective view of a lower member of the loss motion device shown in FIGS. 13 and 15.

Referring to FIGS. 15, 16 and 17, an alternative exemplary sensing device 230 comprises an upper member 234 and a lower member 236. The upper and lower members 234, 236 are shown assembled together in FIG. 15. The upper member 234 is best seen in FIG. 16, where it is flipped upside down as a bottom perspective view from its assembled position of FIG. 15 to illustrate various aspects thereof. The lower member 236 is best seen in FIG. 17 where it is illustrated as a top perspective view. With specific reference to FIGS. 15 and 16, the upper member 234 includes a substantially vertical mounting plate 238 for mounting the upper member 234 to the handle 118, a first projection 240 and a first extension 242. With reference to FIGS. 15 and 17, the lower member 236 includes a substantially horizontal mounting plate 244 for mounting the lower member 236 to the steering arm 120, a projection receiving portion 246, a pair of stop blocks 248 and a fixed extension 250.

With reference specifically to FIG. 15, the upper member 234 seats into the lower member 236 such that the first projection 240 sits down into the projection receiving portion 246 and projects between the pair of oppositely spaced stop blocks 248. The stop blocks 248 limit the degree of rotational movement of the handle 118 with respect to the steering arm 120 by interfering with the rotational movement of the first projection 240 of the upper member 234 with respect to the lower member 236. Resilient members 249 may be used to center the upper member 234 with respect to the lower member 236. The resilient members 249, e.g., rubber sandwich mounts, compression or torsion spring(s) also provide a resistance to the operator's turning force.

The first extension 242 is positioned in spaced relation to the fixed extension 250, and a motion sensor 252 is mounted therebetween. An exemplary motion sensor 252 is a linear potentiometer such as one of the 9600 series linear potentiometers available from BEI, Duncan Electronics Division. As the handle 118 is rotated with respect to the steering arm 120, the first projection 240 pivots between the stop blocks 248, and the first extension 242 of the upper member 234 moves correspondingly with respect to the fixed extension 250 on the lower member 236. This movement is translated to a signal, e.g., based upon the varying resistance measured by the linear potentiometer. The motion sensor 252 may alternatively comprise other motion sensing devices, such as a rotary potentiometer or encoder, however, corresponding adjustments would be required between the first extension 242 and the fixed extension 250.

During use, it is contemplated that the handle 118 and steering arm 120 of the truck 100 may be subject to abuse and impact with foreign objects. Accordingly, the upper member 234 may be bolted to the handle 118 using breakaway bolts 254 to prevent a harsh impact from destroying the motion sensor 252. Likewise, the lower member 236 may be bolted to the steering arm 120 using breakaway bolts 256. The shearing force of the breakaway bolts will, of course, be application specific.

Steer by Wire

Figure 18:
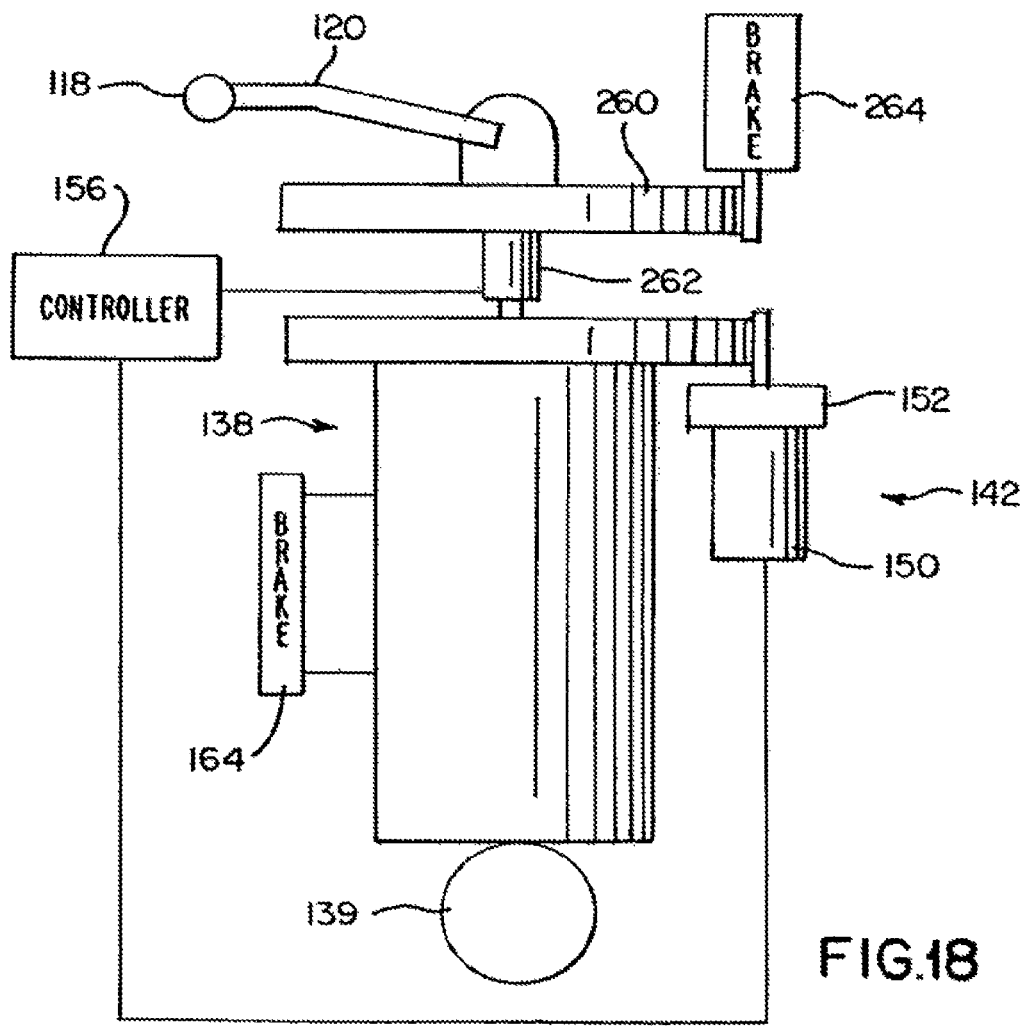
FIG. 18 is a basic schematic diagram of an electrical steering assist for a steer by wire system where the amount of steering assist is derived from a loss motion sensor and the steering arm is mechanically isolated from a steerable wheel.

A steer by wire system is illustrated in the basic schematic diagram of FIG. 18. The steering arm 120 is secured to a top plate 260. A motion sensor 262, corresponding to the sensor 158 shown in FIG. 3, detects movement of the steering arm 120 (or alternatively, the top plate 260) relative to a reference, e.g., the drive assembly 138, and an output signal derived thereby is coupled to the controller 156. The motion sensor 262 may alternatively comprise several sensing devices. Under this arrangement, the controller 156 may derive a steering signal based upon data collected from each sensing device. For example, a first sensing device may detect the position of the steering arm 120 relative to a first reference, e.g., a fixed point on the vehicle frame, and a second sensing device may detect the position of a second component on the vehicle relative to a second reference, e.g., the top plate 260 or other component of the drive assembly 138 relative to the same fixed point on the vehicle frame. In this example, the controller 156 may derive a steering control signal by evaluating the difference or other function between the two (or more) sensing devices.

The controller 156 is coupled to the steering motor 150 and gearbox 152 in a closed loop system as described in greater detail herein. The controller 156 is configured to output a control signal to the steering motor 150 so as to turn the drive assembly 138 to the position of the handle 118. In a steer by wire system, the steering arm 120 moves independent of the drive assembly 138. Moreover, the handle 118 is mechanically decoupled from the drive assembly 138 so that manual steering is not available if the control system is inoperable. Accordingly, the brake 164, as described in greater detail herein, is provided to stop the truck in that event. Also, depending upon the manner in which the steering arm 120 is coupled to the top plate 260, a tiller brake 264 or other force generating device may be provided to produce a resistance in response to the turning force on the steering handle 118 by an operator.

Additional Features

Adjustable Steer Assist

Figure 19:
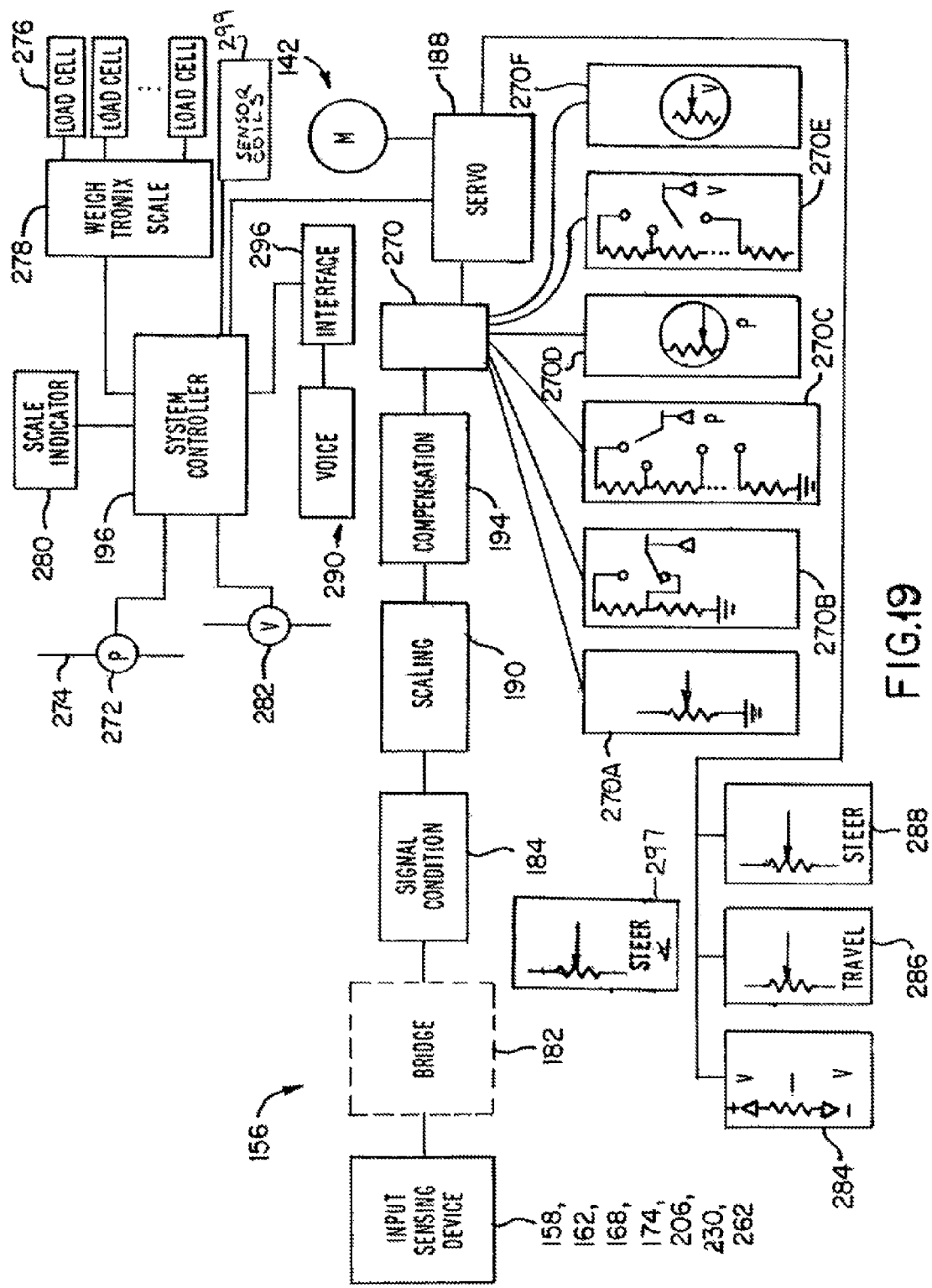
FIG. 19 is a schematic diagram illustrating a controller having a variety of optional secondary inputs which are shown collectively to illustrate several exemplary inputs that the differences therebetween, according to an embodiment of the present invention.

The required turning force may be made adjustable as schematically illustrated in FIG. 19. The input sensing device, e.g., one or more of the devices 158, 162, 168, 174, 206, 230, 262 as described above, is coupled to the controller 156. Also as described above, the controller 156 may include a bridge 182, such as if the input sensor comprises a strain gauge or similar force sensor. The controller 156 also includes a signal conditioner 184, optional scaling circuit 190 and optionally, one or more compensation circuits 194 as described more fully herein. Additionally, the signal may be coupled through an adjustable attenuation circuit 270 before reaching the servo 188.

The attenuation circuit 270 can be implemented in a number of different ways, a few examples of which are schematically illustrated in FIG. 19, as designated by the reference numeral 270 plus an alphabetical suffix A-F. It shall be observed that in practice, the attenuation circuit, if provided, may include one of more of the exemplary circuits 270A-270G. The attenuation circuit 270 may include a control that is mounted in an operator accessible location to provide an adjustable steering effort as schematically illustrated by the potentiometer in the first attenuation circuit 270A. The first attenuation circuit 270A varies the steering effort by changing the strength of the signal, or changing the gain, seen by the servo 188 of the controller 156. For example, a petite operator may require a greater degree of steering assist compared to a larger operator, who may prefer less steering assist. The first attenuation circuit 270A allows for each operator to custom tailor the desired amount of steering assist. Alternatively, the first attenuation circuit 270A may be programmed by a technician or other designated person so that the first attenuation circuit 270A may be inaccessible by the operator.

In lieu of (or in addition to) the first attenuation circuit 270A, a load adjusted turning force circuit 270B may be provided. As schematically illustrated, a pressure sensitive switch is set to automatically switch between two or more attenuation settings, such as at preset detected hydraulic pressures in the forks. For example, a model PDFH hydraulic pressure switch manufactured by Pressure Devices Inc. may be incorporated into the controller 156. Under this arrangement, a pressure sensor 272 in the hydraulic lift line 274 is used to sense the load on the forks of the truck. This pressure is read by the system controller 196 and is communicated to the pressure switch in the load adjusted turning force circuit 270B.

As an example, the pressure to activate the pressure switch could be set to activate at a predetermined threshold, e.g., 1500 psi. When the measured pressure is less than this value (light weight load) the steer assist force would be at a first, relatively low level. When the load is such that the hydraulic pressure seen by the pressure switch is greater than the threshold, i.e., greater than 1500 psi, the pressure sensor would activate and the steer assist would be increased to a second, relatively higher position.

As schematically illustrated, the first position (the pressure is below the threshold) is represented by the switch connected between the two resistors in the resistor ladder schematically shown in the load adjusted turning force circuit 270B. This essentially forms a voltage divider that attenuates the signal to the servo 188. By attenuating the signal to the servo 188, the system decreases the steer assist force provided for a given operator-applied force. When the pressure switch is in the second position (the pressure exceeds the threshold), the output of the switch is seen across both resistors in series, thus no attenuation to the signal is provided. Thus the steer assist force provided for the given operator applied force is increased compared to the first position. As such, one step of steering assistance change is programmably set based upon a single threshold pressure used to trigger the pressure switch. Of course, multiple steps may be provided as illustrated by multiple load adjusted turning force circuit 270C.

As an alternative to a pressure sensor 272 on the hydraulic lift line 274, a load weighing system can be implemented using one or more members 276 and a scale 278. Under this arrangement, the members 276 can be incorporated into the forks of the truck, and output a signal to the scale 278 that communicates the load weight to the system controller 196. The members 276 could further perform the dual purpose of providing a signal to a scale indicator 280 that displays the load weight on the forks of the truck. Of course, if a visual indication of load weight is not desired, the scale indicator 280 can be omitted. The load weight from the scale 278 could be used to replace the pressure control in either the load adjusted turning force circuit 270B or the multiple load adjusted turning force circuit 270C.

Alternatively, the pressure switch may be replaced by a pressure transducer that gives a variable output as the load changes as schematically indicated by the transducer circuit 270D. Depending upon the specific implementation, a new input to the servo may be required to accommodate the pressure transducer output. Alternatively, additional conditioning, filtering and transforming circuitry may be provided to convert the transducer output into a signal suitable for processing by the servo 188.

Again, in addition to, or in lieu of the above-described steer assist adjustments, a speed feedback sensor may be used to set the level of steer effort needed for various traveling conditions by a speed to force circuit 270E. For example, a velocity sensor 282, e.g., speed tachometer, may be used to generate a control signal that switches between one or more attenuation values, thus affecting the steer force required. Operation in this regard is similar to that described with reference to circuits 270B, 270C, except that the threshold triggers are velocity values and not pressure values. Alternatively, a velocity transducer/sensor may be used to continuously adjust the required operator applied turning force in a velocity transducer circuit 270F.

Additionally, the controller 196 can be implemented to maintain a turning force that is nearly constant or to effect a turning force having desired parameters by adjusting the required steering effort based on truck weight, travel speed, travel direction, floor friction or other measurable conditions. This is accomplished by varying the gain of the control system in response to inputs from sensors such as the pressure sensor 272 or scale 278, and speed/direction tachometer 282 to compensate for driving conditions.

It is noted that the attenuation circuits 270A-F discussed above could be amplification circuits, i.e., depending on whether the signal needs to be decreased or increased for setting the appropriate steer assist value.

Remote Control

A truck that has power assist steering has the flexibility to be steered from multiple positions. For a truck used in order picking, the need for the operator to go to the front of the truck near the forks for loading items thereon, and return to the rear of the truck to drive the truck to a new location requires numerous steps. These steps are reduced by including a means on the truck to control the truck travel and/or steering from the front or the side(s) thereof.

For example, a joystick controller 284 may be provided. The joystick controller 284 is operated using a joystick 116, e.g., model JC 400 from Penny and Giles or a suitable model from ETI Systems, which may be mounted on one or both sides of the truck in the area of the load backrest (best illustrated in FIG. 1). The requested direction and speed of travel of the truck may be deduced from signals generated by the joystick 116 and/or one or more directional switches, e.g., controls 114 shown in FIG. 1. Alternatively, both the requested direction and speed can be measured directly from the joystick, such as by detecting the voltage and polarity of a potentiometer center wiper. For example, the servo controller 156 may generate plus and minus dc outputs that are applied to opposite ends of the potentiometer as schematically illustrated in the joystick controller 284. The potentiometer output voltage thus varies from zero volts for no steering movement to plus volts for steering/speed in a first direction and minus volts for steering/speed in a second direction opposite of the first direction.

Instead of the joystick 116, the travel and steering controls could be separate. For example, a travel circuit 286 may comprise a lever that moves forward and backward to control travel direction and speed. A steering circuit 288 may provide a lever that moves side to side to control steering. The levers could alternatively be replaced by corresponding twist grips. Also, while the travel circuit and steering circuit 286, 288 are schematically illustrated as having potentiometers, it shall be appreciated that the operative controls can be replaced by strain gauges or by a non-contact technology such as Hall Effect transducers, inductively coupled transducers or other non-contact transducers. Of course, a matching interface circuit may be required or the controller 156 would need to be designed to work with the transducer as described above.

Additionally, the truck may incorporate a steer limit switch that allows travel by side control if the steerable wheel is within a set angle of straight ahead. An exemplary embodiment of which is set out in U.S. Pat. No. 6,595,306, which is assigned to the assignee of the present application and the disclosure of which is incorporated herein by reference in its entirety.

Figure 20:
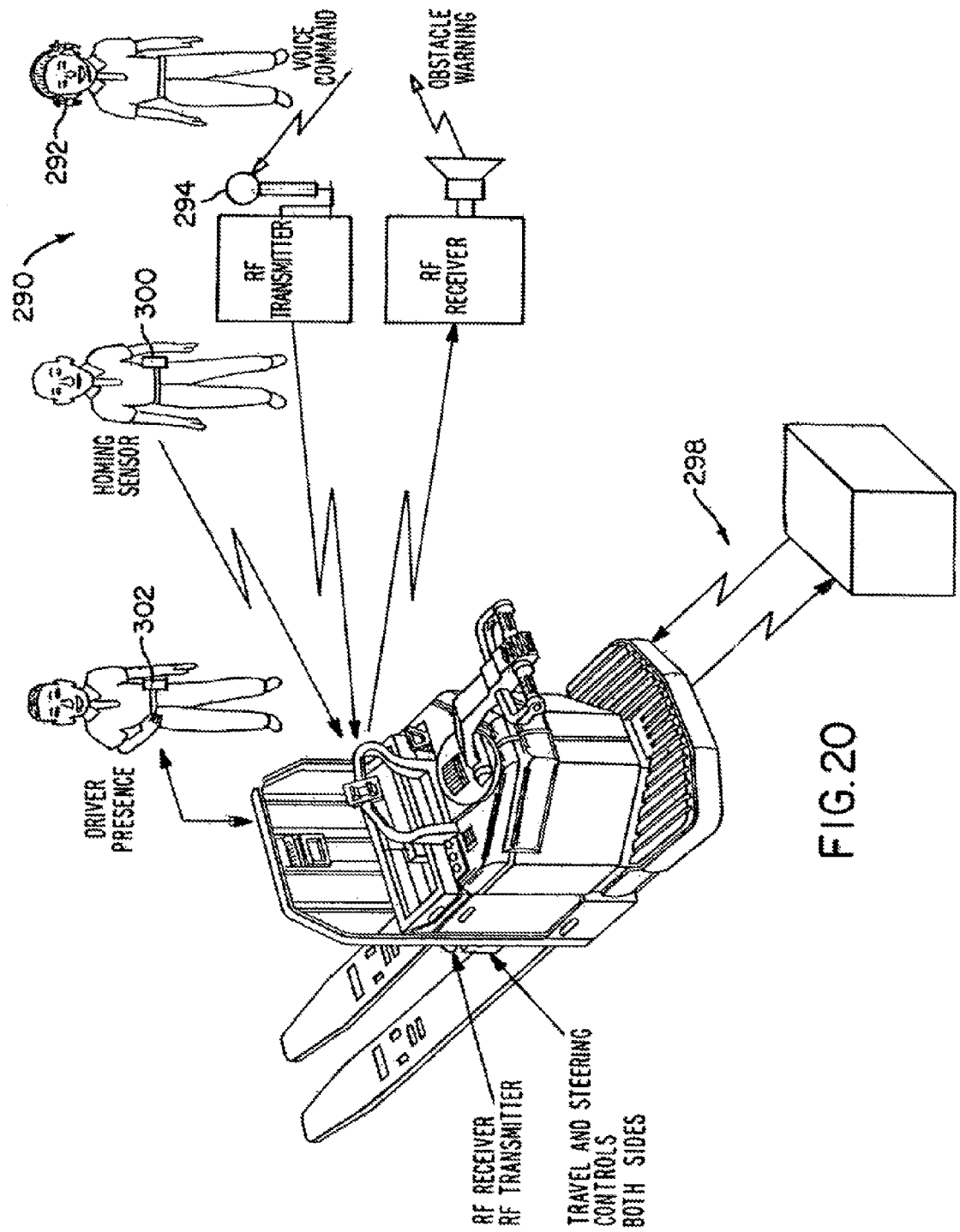
FIG. 20 is a schematic diagram illustrating the manner in which several secondary inputs into a controller of an electrical steering assist system interact with external events according to an embodiment of the present invention.

It is also possible to integrate wireless remote control of travel and/or steering into the various embodiments of the present invention as illustrated in FIGS. 19 and 20. One such remote control approach is to implement a voice control system 290. A speech processing system, such as model Micro Introvoice 11 by Voice Connexion, may be used to provide a speaker dependent, voice operated control system. The voice control system 290 is programmed for a predetermined vocabulary of spoken command words, which may be used to control the truck. In operation, the operator speaks a command word, the voice control system 290 recognizes the preprogrammed speech and sends the appropriate output command to the truck. Depending upon the sophistication of a given voice control system, the system may need to be trained to recognize the various operators, for example, by storing spoken examples of the commands as a profile for each operator. The smaller the profile, the greater the likelihood that a command is either missed or misinterpreted.

To enhance reliability, the command words are preferably chosen so that they do not sound similar to one another. The easier it is for the voice control system 290 to identify and differentiate the various commands, the greater the recognition accuracy. One way to differentiate commands is to make the commands more than one word in length. The use of more than one word in a spoken command would likely give greater recognition accuracy as long as each additional word in the command is also unique to the other commands. For example, GO LEFT and GO RIGHT may provide no better recognition results than LEFT and RIGHT because GO is in both commands. For illustrative purposes, a better alternative may be STEER LEFT and TURN RIGHT.

In one working embodiment of the present invention, the following vocabulary words and corresponding functions were set up and successfully tested with the above described Micro Introvoice II system:

| | |
|---|---|
| POWER | turns on the power to the interface module |
| STOP | turns off the power to the interface module |
| OFF | same function as STOP |
| TRAVEL FORWARD | starts truck travel in the forward direction |
| STOP TRAVEL | stops truck travel |
| RIGHT | starts steering to turn truck to right |
| LEFT | starts steering to turn truck to left |
| STOP STEER | stops steering movement |
| BRAKE | releases coast control electromagnetic brake which releases the tiller handle 118 and applies the truck brake |

Depending upon the sophistication of the voice control system 290, it may be desirable to equip the operator with a headset 292 and/or a microphone 294.

With reference to FIG. 19, the voice control system 290 includes an eight-bit parallel output port that is used to transfer the output command to a voice control interface circuit 296. The voice control interface circuit 296 includes relays, switches or other necessary circuitry to interface into the appropriate operational controls via the system controller 196. To reduce the demands placed on the operator by using voice control, voice control may be limited to travel and braking commands. Also, a warning light and/or a warning horn (not shown) may be provided to indicate and serve as a reminder that voice control is active.

The voice control system 290 may optionally respond to a verbal command with a corresponding verbal acknowledgement. As an example, when the command POWER is given, the voice control system can respond with the verbal phrase POWER ON. However, this increases the time until a follow up command can be given so this may likely only be used for certain non-timing critical commands such as POWER and OFF. Such verbal replies to a recognized command can be sent by a speaker on the truck or can be sent by wireless radio to the headset with an earphone that the operator is wearing.

A wireless transmitter and receiver, e.g., a Shure TVHS V wireless system by Sure, may be used for wireless communication. However, care must be taken in selecting the appropriate transmitter and receiver based upon power, proximity and range. For example, some wireless receivers overload when the transmitter is positioned too close thereto. Alternatively, remote radio control or infra red control may be implemented.

Referring to FIG. 19, as yet another example, an optional steer angle control 297 may be provided. The steer angle control 297 is implemented using a potentiometer, encoder or other suitable input device, and may be positioned at any convenient location. The steer angle control 297 interacts with the controller 156 and the drive assembly 138, and allows an operator to set and maintain a desired heading. As an example, an operator may line up the truck 100 in an aisle parallel to a row of racks in a warehouse operation. Using angle sensing feedback from the steer angle control 297, the heading of the truck 100 may be maintained parallel to the racks as the truck 100 moves down the aisle. The steer angle control 297 thus prevents drift of the truck 100 and maintains its course.

Further, the steer angle control 297 may be used with the other operative controls described herein. When used in combination with additional steering controls, the steer angle control 297 sets the heading, and the additional operative control(s) may be used to determine whether the truck 100 moves forward, right, left or stops, etc. For example, the steer angle control 297 may be used in combination with the handle 118 and steering arm 120 or a remote command device, such as the voice control system 290. When used with the voice control system 290, operator voice commands such as LEFT or RIGHT may be used to cause the truck 100 to move a preset distance and still maintain the heading set by the steer angle control, e.g., parallel to the racks. The command words FORWARD, COAST, and STOP may be used to control traction while the steer system automatically corrects itself to maintain a straight orientation.

With any type of remote control travel and/or steering remote system, it may be desirable to provide an obstacle detection system 298. Such a system would scan the path that the truck 100 will be traveling for people or obstacles such as boxes, racks or another truck. If something is detected, the truck 100 could perform a prescribed function such as to slow down until it reaches a preset distance and then stop. Another option would be to alert the operator with an audible alarm or a spoken warning.

Referring to FIG. 20, the operator may be equipped with a homing beacon 300. Under such an arrangement, the truck 100 senses and follows the homing beacon 300 provided on the person of the operator, but is programmed to remain a certain distance away from the homing beacon. Also, a presence detector 302 may be implemented. Under this arrangement, the truck 100 would not operate if the operator is too close to the truck or too far from the truck. Essentially, the operator wears a device that the truck is capable of sensing and the truck 100 determines the position and distance of the operator from the truck and controls the truck accordingly.

Figure 21:
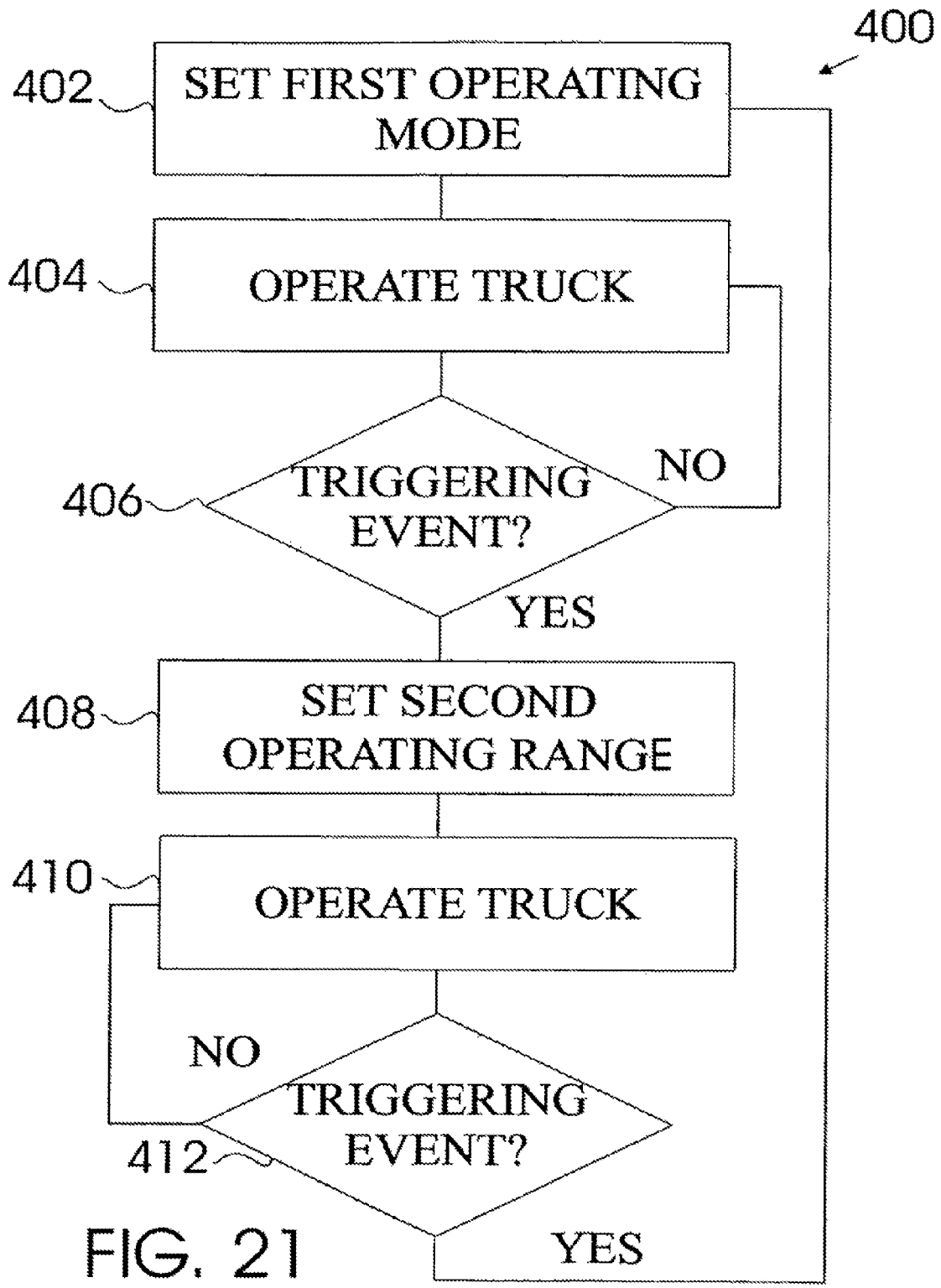
FIG. 21 is a flow chart illustrating one exemplary control flow for multimodal operation.

The controller 156 may also be configured to switch, either manually, or automatically, between one or more modes of operation that comprise steering assist. Referring to FIG. 21, a flow chart 400 illustrates a high level multimodal flow control. Initially, a first operating mode is set at 402. The first operating mode can comprise any one of the steer assist or remote control systems described more fully herein. The truck 100 is operated in the first mode at 404 until a predetermined triggering event occurs at 406. The triggering event can be based upon any number of factors, examples of which include a change in the operating conditions including environment or location, change in load on the truck 100 etc. A second operating mode is set at 408 in response to the triggering event at 406. The truck 100 is operated in the second operating mode until a triggering event occurs at 412. Upon detecting the triggering event at 412, the truck 100 reverts back to the first mode of operation at 402. Of course, the above flow diagram is merely illustrative and scalable so as to encompass more than two different modes of operation.

For example, referring to FIGS. 19 and 21, the truck 100 may include one or more wire detecting devices, e.g., sensor coils 299 for use in a guided vehicle warehouse system. Essentially, an electrical signal supplied to a buried wire in the floor of a warehouse is detected by the sensor coils 299. The sensor coils 299 communicate a signal to the controller 196, and the controller 196 uses the information from the sensor coils 299 for steer guidance. That is, upon the sensor coils 299 detecting the guidance signal, the controller 196 may automatically take the truck 100 into a first procedure where the truck 100 is guided into alignment with the buried wire. Once the truck 100 is properly aligned, the controller 196 may enter a second procedure where the controller 196 automatically tracks to the wire such that the truck alignment is maintained. The sensor coils 299 and corresponding wire guidance system are described in detail in U.S. Pat. No. 5,008,604, entitled "Dynamic Clipper For Use in a Vehicle Guidance System" to the same assignee, the contents of which are incorporated by reference herein.

It is noted that wire guidance systems are expensive. As such, wire guidance may be provided only in high usage areas, e.g., picking isles. Wire guidance may be omitted however, from low usage aisles. Under this arrangement, the first operating mode of the truck 100 is set to operate in a remote, wire guidance mode at 402. The truck may then be operated by wire guidance in the wire equipped areas of the warehouse. The setting up of the first mode of operation at 402 may occur automatically, such as when the truck is driven into a wire equipped area, or alternatively, the truck operator may manually set up the first operating mode.

When a triggering event occurs at 406, e.g., the truck operator drives out of a wire equipped area or manually disables the wire guidance control, a second operating mode is set up. The second operating mode may be entered at 408 either manually, or automatically, and may comprise a steering assist as set out in any one or more of the various embodiments herein, including voice control, remote control, and power assisted steering control. As an example, a truck operator may need to drive around the end of a wire equipped aisle to go to the next aisle. Alternatively, a picking task may be completed and the truck operator may want to leave a wire equipped area to deliver the picked items to a staging area, loading dock, or other processing station. Under this arrangement, the truck 100 may switch to a steering assist mode at 408 as set out more fully herein. The switching between the two modes could be either manual, e.g., selecting the mode by use of a switch, or automatic, e.g., when the wire is sensed, the truck steers by wire guidance mode and if the driver turns the truck 100 with the handle 118, the mode of operation reverts to manual turning control with steer assist.

As another example, while in a wire guidance equipped aisle, wire guidance could be used to travel parallel to the racks instead of dead reckoning by the angle sensing device 297. Again, a triggering event, e.g., the driver manually steering the truck or by use of a remote command, the driver could move off the wire, e.g., to navigate around an obstacle.

The functionality of truck controls 100 may also selectively be enabled or disabled based on which steering mode of operation at 402, 408 is active. As an example, when in a wire guidance only mode of operation, the system controller 196 may enable only the speed and direction controls on the truck 100, and if in a non-wire guidance mode of operation, the controller 196 may enable speed, direction, and steering controls on the truck 100. Again the switching could be automatic or manual.

Figure 22:
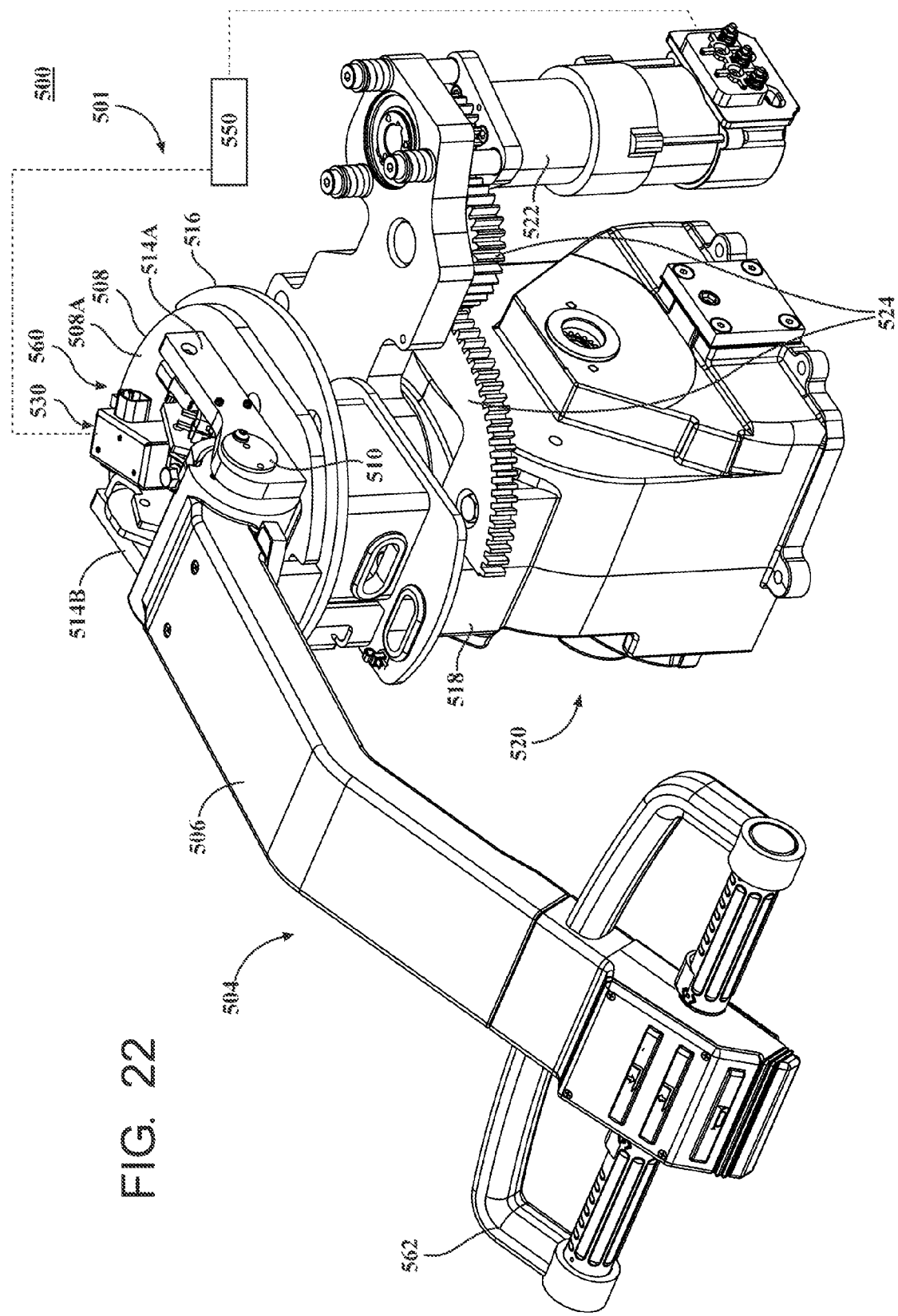
FIG. 22 is partial perspective view of a materials handling vehicle including a strain measuring assembly according to another embodiment of the present invention.
Figure 23:
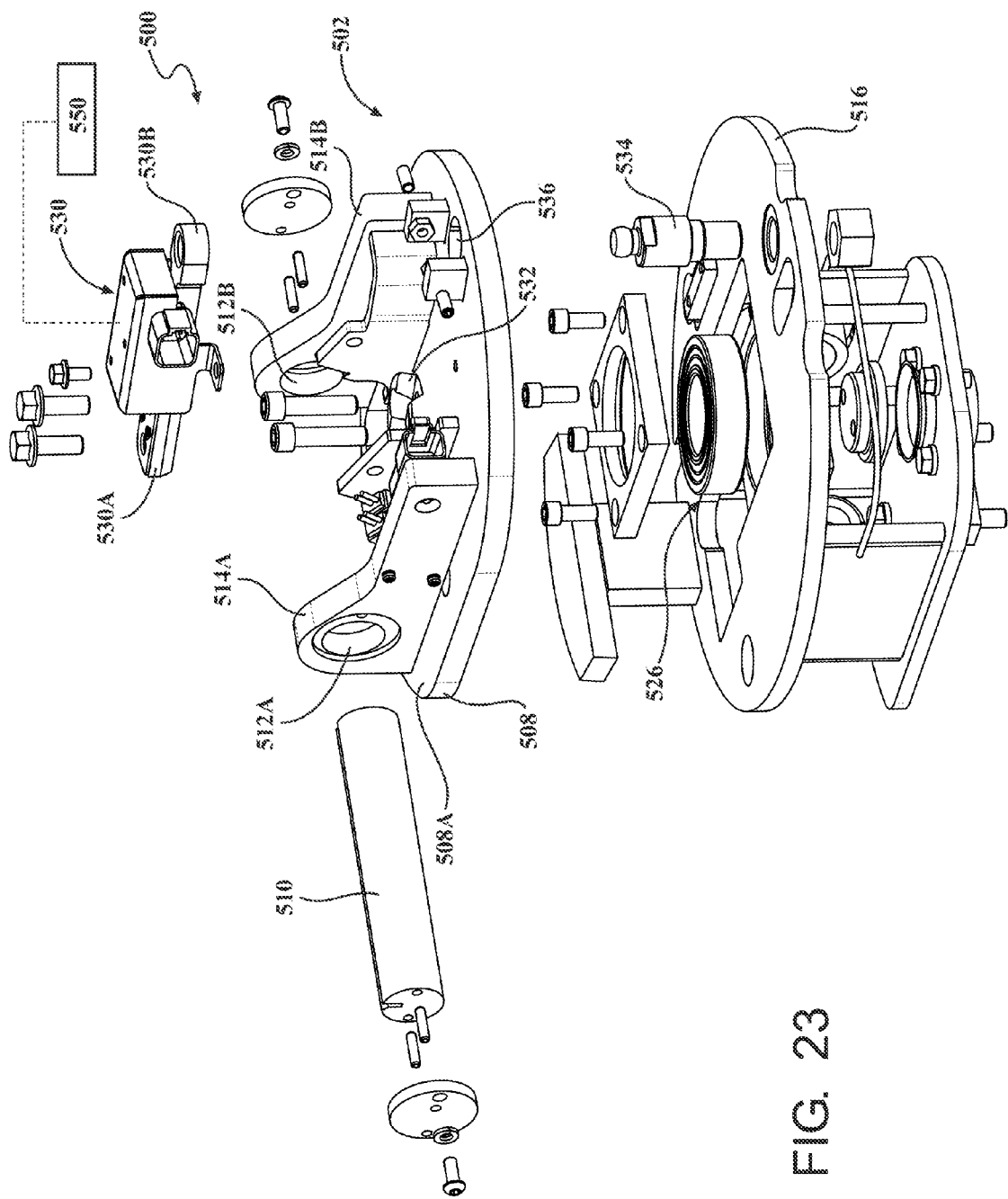
FIG. 23 is an exploded view of the strain measuring assembly of FIG. 22.

Referring now to FIGS. 22 and 23, a portion 501 of a materials handling vehicle 500 including a strain measuring assembly 502 according to another aspect of the invention is shown. A steering arm 504 (see FIG. 22) of the vehicle 500 according to this embodiment comprises a single arm 506 as opposed to upper and lower arms as discussed above with reference to FIGS. 6 and 7. The arm 506 is mechanically coupled to an upper plate 508, also referred to herein as a first plate 508, of the strain measuring assembly 502 via a pivot shaft assembly 510 that is received in a pair of spaced apart openings 512A, 512B (see FIG. 23) that are formed in corresponding flanges 514A, 514B that extend upwardly from an upper surface 508A of the upper plate 508. The coupling between the steering arm 504 and the upper plate 508 allows for vertical pivoting movement of the steering arm 504 relative to the upper plate 508, wherein such pivoting movement of the steering arm 504 is used to move the steering arm 504 into the braking and operating arcs as discussed herein.

A lower plate 516, also referred to herein as a second plate 516, of the strain measuring assembly 502 is coupled to a drive unit 518 of a drive assembly 520, and the drive unit 518 is coupled to a steer drive unit 522 via a gearing 524. The steer drive unit 522 may comprise the same or equivalent working components as that of the steer drive unit 142 described above. The first and second plates 508, 516 are coupled together via a four point contact bearing 526 (see FIG. 23) that allows for a small amount of relative rotational movement between the upper and lower plates 508, 516 as discussed further below.

Figure 24:
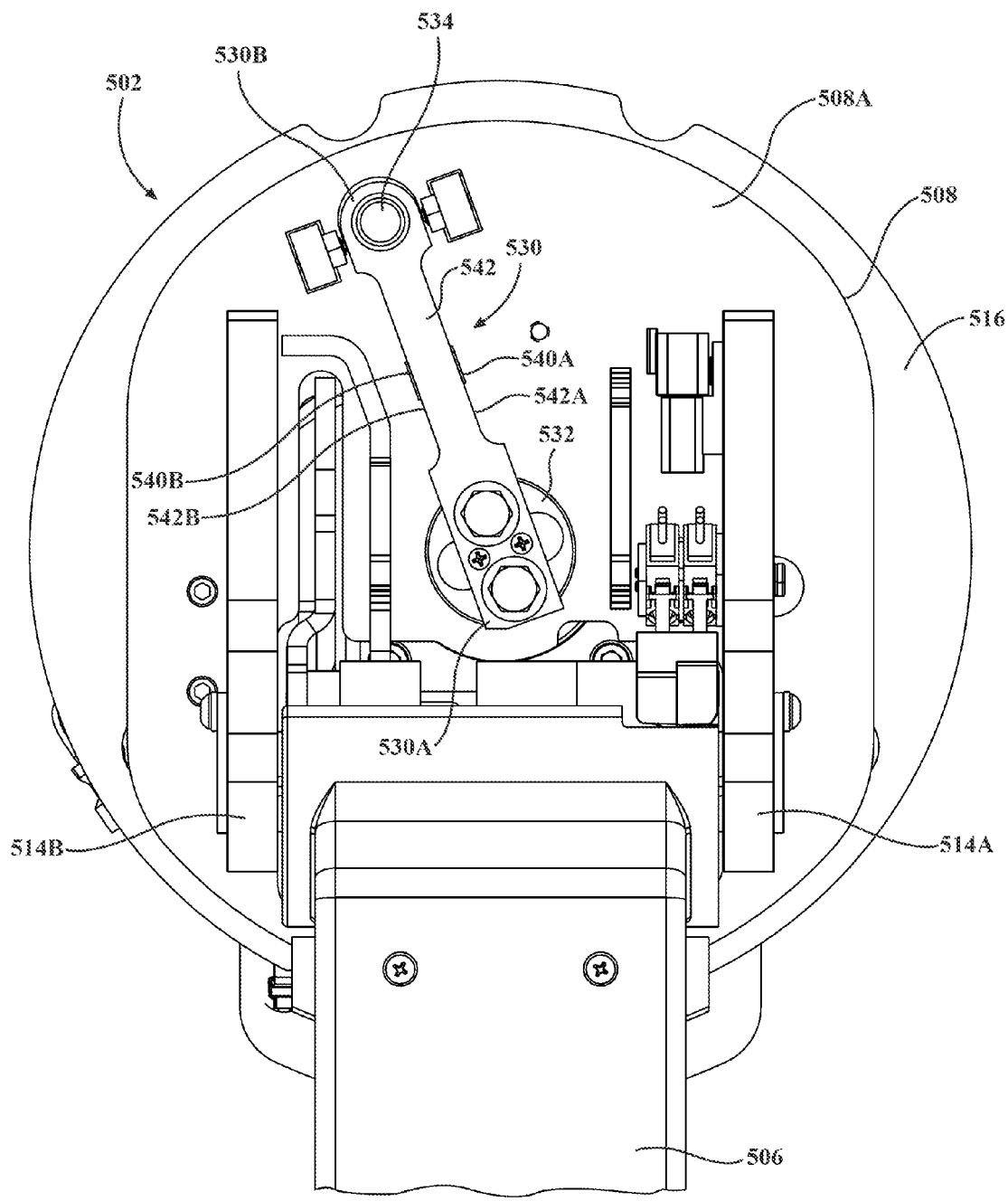
FIG. 24 is a top elevational view of a sensor with the cover removed of the strain measuring assembly of FIGS. 22 and 23.

Referring to FIGS. 23 and 24, the illustrated strain measuring assembly 502 additionally comprises a strain gauge type load cell sensor 530 that sits on the upper surface 508A of the upper plate 508. The load cell sensor 530 is a bending beam style sensor with a first end 530A mechanically coupled to the upper plate 508 and a second end 530B opposite the first end 530A mechanically coupled to the lower plate 516. Specifically, as shown most clearly in FIG. 23 the first end 530A of the load cell sensor 530 is received and bolted in a cradle 532 that extends upwardly from the upper surface 508A of the upper plate 508, and the second end 530B of the load cell sensor 530 is coupled to a shaft 534 that is coupled to the lower plate 516 and extends upwardly from the lower plate 516 through an oversized aperture 536 formed in the upper plate 508. The shaft 534 must be sufficiently strong to withstand and transmit forces exerted thereon when the upper plate 508 rotates relative to the lower plate 516, i.e., caused by an operator pivoting the steering arm 504 in the horizontal direction to effect steering of the vehicle 500, as discussed further below. Further, the aperture 536 must be oversized sufficiently to allow an amount of relative rotational movement between the upper and lower plates 508, 516.

Referring now to FIG. 24, the load cell sensor 530 according to this aspect of the invention comprises first and second strain gauge sensors 540A, 540B located on opposed side edges 542A, 542B of a metal beam 542 defining a main structural element of the load cell sensor 530. The first and second strain gauge sensors 540A, 540B sense flexure in the metal beam 542, which flexure results from relative rotational movement between the upper and lower plates 508, 516. Specifically, during use of the materials handling vehicle 500 according to this aspect of the invention, as the operator pivots the steering arm 504 in the horizontal direction to effect steering of the vehicle 500, the force applied by the operator on the steering arm 504 causes a slight rotational relative movement between the upper and lower plates 508, 516 of the strain measuring assembly 502. The relative rotational movement between the upper and lower plates 508, 516 is proportional to the rotational force applied to the steering arm 504 by the operator and is sensed by the load cell sensor 530, i.e., by the first and second strain gauge sensors 540A, 540B. Specifically, the relative rotational movement between the upper and lower plates 508, 516 causes a corresponding flexure in the metal beam 542, which flexure is sensed by the first and second strain gauge sensors 540A, 540B. The first and second strain gauge sensors 540A, 540B send respective signals of the sensed flexure in the metal beam 542 to a controller 550 (see FIGS. 22 and 23), which controller 550 may comprise one or more control elements, wherein the signals each correspond to a strain measurement signal that is proportional to the operator rotational force applied to the steering arm 504. The controller 550 processes the strain measurement signals and generates a corresponding control signal that is supplied to the steer drive unit 522 to provide steering assist in a manner as described above, e.g., the controller 550 varies the amount of steering assist provided by the steer drive unit 522 based upon a level of force detected by the load cell sensor 530. The controller 550 according to this embodiment may include the same structure as the controller 156 described above, e.g., a bridge completion module, a strain gauge input signal conditioner, a power supply, and a compensation circuit, which each function as described above.

It is noted that the signals sent by the first and second strain gauge sensors 540A, 540B in the embodiment shown should be substantially identical, i.e., since the sensors 540A, 540B are located at the opposed side edges 542A, 542B of the metal beam 542 directly across from one another. If the signals are not substantially identical, the controller 550 may implement some type of response routine, such as, for example, by implementing a vehicle stop or slowing action, sending an alert to the operator, or dynamically switching steer assist control from one strain gauge sensor 540A or 540B to the other 540B or 540A. It is also noted that the load cell sensor 530 according to this aspect of the invention could utilize only a single strain gauge sensor with only a single signal sent to the controller 550. Additionally, if two (or more) strain gauge sensors are used, they need not be directly across from one another on the opposed side edges 542A, 542B of the metal beam 542, i.e., they could be positioned at any suitable locations.

In addition to the load cell sensor 530, an optional secondary input sensing device may also be provided, such as any of those described above.

A strain sensitive region 560 (see FIG. 22) according to this embodiment is not located between upper and lower arms of a steering arm or between a handle and a steering arm as described in the embodiments above, but is rather located between the steering arm 504 and the drive assembly 520 within the steerable wheel drive housing 122 shown in FIG. 1. Positioning the strain sensitive region 560 inside the housing 122 protects the strain measuring assembly 502 from impacts, such as those made to the steering arm 504, which may occur frequently with this type of vehicle 500. Further, since there is no structural disruption in the single arm 506 according to this embodiment or between the arm 506 and a handle 562 (see FIG. 22), the arm 506 itself and the junction between the arm 506 and the handle 562 are robust with little or no motion occurring therebetween, thus providing an operator with enhanced feel while steering. This also improves the control system bandwidth, as other systems using sensors that measure relative motion between two or more components typically provide reduced steer assist or heavily filtered signals, which may lead to reduced responsiveness in order to prevent control system instability.

Moreover, the controller 550 may optionally be configured such that steer assist is not provided until the steering arm 504 is transferred from a brake position to an operating position, e.g., by rotating the steering arm 504 out of a braking position corresponding to one of the braking arcs described herein and into an operating arc. This feature prevents steer assist in the event that the vehicle 500 is powered up with either a force on the steering arm 504 or an existing force on the load cell sensor 530.

Further, in accordance with another aspect of the present invention, the controller that implements the steer assist functions described herein may hold the last requested drive unit position for a predetermined time period, e.g., 2-3 seconds, after the steering arm is moved to a brake zone if no further rotational force is applied to the steering arm within the predetermined time period, thus preventing a tire wind up release function from occurring within the predetermined time period. After the expiration of the predetermined time period, the tire wind release function may be implemented slowly to release the tire wind up in a controlled manner to avoid abrupt movement of the steering arm that may otherwise result from the release of the tire wind up.

Moreover, if the truck is operating in a coast mode, for example, as disclosed in U.S. Pat. No. 6,595,306, assigned to the same assignee, and which is herein incorporated by reference, the tire wind up release function may be released after a more extended time period than the predetermined time period, e.g., 10 minutes, after no rotational force is applied to the steering arm. While coast mode is in use, the operator often prefers that the vehicle maintains its current heading while it is coasting. With the vehicle in a stationary position, the operator may need to make steer corrections in preparation for truck movement to the next desired vehicle location. In this state, it may be advantageous for the tire wind up release function to be delayed by the extended time period, as implementing the tire wind up release function in a shorter time period, e.g., 2-3 seconds, would result in a change to the operator's desired steer direction. The extended period, which optionally may be modifiable by an operator or technician, is preferably selected to allow the operator sufficient time to complete desired off-vehicle tasks, e.g., order picking, and return to an operating position of the truck before the tire wind up release function occurs. Using such an extended time period during coast mode operation of the vehicle has an additional benefit of decreasing the number of times that the steering arm will move due to the release of the tire wind up, which is particularly beneficial during coast mode since the steering arm is positioned in an operating position while in coast mode, as opposed to a braking position, and in an operating position protrudes further away from the truck.

The remaining elements of the vehicle 500 may be as described above for the truck 100.

Having described the invention in detail and by reference to preferred embodiments thereof, it will be apparent that modifications and variations are possible without departing from the scope of the invention defined in the appended claims.

What is claimed is:

1. A system for providing an electrical steering assist for a materials handling vehicle comprising:
   a drive housing;
   a steerable wheel coupled to the drive housing;
   a steering arm pivotally mounted to the drive housing, the steering arm operatively configured to determine a steering direction of the steerable wheel by moving the steering arm from side to side in a generally horizontal plane;
   a steer drive unit coupled to the steerable wheel;
   an input sensing device arranged to detect a turning force applied to the steering arm by an operator, wherein the turning force is provided to change the angle of travel of the vehicle, the input sensing device comprising a strain measuring assembly defining a strain sensitive region between the steering arm and the steer drive unit, wherein a coupling between the steering arm and the strain measuring assembly allows for vertical pivoting movement of the steering arm relative to the strain measuring assembly, wherein such pivoting movement of the steering arm is used to move the steering arm into braking and operating arcs; and
   a controller operatively configured to control the steer drive unit to turn the steerable wheel based upon a signal from the input sensing device, wherein the controller is operatively configured to vary an amount of steering assist provided to the steering arm by the steer drive unit based upon a level of force detected by the input sensing device.

2. The system according to claim 1, wherein the strain measuring assembly comprises an upper plate coupled to the steering arm.

3. The system according to claim 2, wherein the strain measuring assembly further comprises a lower plate spaced from the upper plate and coupled to a drive unit of a drive assembly of the vehicle, the drive unit being coupled to the steer drive unit.

4. The system according to claim 3, wherein the upper and lower plates are coupled together via a bearing that allows for a small amount of relative rotational movement between the upper and lower plates.

5. The system according to claim 4, wherein the strain measuring assembly further comprises a load cell sensor arranged to output a signal that corresponds to a measure of the force applied to the steering arm.

6. The system according to claim 5, wherein the load cell sensor comprises a bending beam style sensor with a first end mechanically coupled to the upper plate and a second end mechanically coupled to the lower plate.

7. The system according to claim 6, wherein:
   the first end of the load cell sensor is directly affixed to an upper surface of the upper plate; and
   the second end of the load cell sensor is coupled to a shaft that is coupled to the lower plate and extends from the lower plate through an oversized aperture formed in the upper plate.

8. The system according to claim 7, wherein the load cell sensor comprises first and second strain gauge sensors located at different locations on a metal beam of the load cell sensor, wherein the first and second strain gauge sensors sense flexure in the metal beam that results from relative rotational movement between the upper and lower plates.

9. The system according to claim 8, wherein the first and second strain gauge sensors send respective strain measurement signals of the sensed flexure in the metal beam to the controller, wherein the controller processes the strain measurement signals and generates a corresponding control signal that is supplied to the steer drive unit to provide steering assist to the steering arm based upon a level of force detected by the load cell sensor.

10. The system according to claim 9, wherein, if the signals sent by the first and second strain gauge sensors to the controller are not substantially identical, the controller implements a response routine.

11. The system according to claim 10, wherein the response routine comprises one or more of: implementing a vehicle stop or slowing action, sending an alert to the operator, or dynamically switching steering assist control from one of the first and second strain gauge sensors to the other.

12. A system for providing an electrical steering assist for a materials handling vehicle comprising:
   a drive housing;
   a steerable wheel coupled to the drive housing;
   a steering arm pivotally mounted to the drive housing, the steering arm operatively configured to determine a steering direction of the steerable wheel by moving the steering arm from side to side in a generally horizontal plane;
   a steer drive unit coupled to the steerable wheel;
   an input sensing device arranged to detect a turning force applied to the steering arm by an operator, wherein the turning force is provided to change the angle of travel of the vehicle, the input sensing device comprising a strain measuring assembly defining a strain sensitive region between the steering arm and the steer drive unit and comprising spaced apart upper and lower plates, wherein the upper and lower plates are coupled together such that a small amount of relative rotational movement is permitted between the upper and lower plates; and
   a controller operatively configured to control the steer drive unit to turn the steerable wheel based upon a signal from the input sensing device and to vary an amount of steering assist provided to the steering arm by the steer drive unit based upon a level of force detected by the input sensing device.

13. The system according to claim 12, wherein the upper plate is coupled to the steering arm.

14. The system according to claim 13, wherein the lower plate is coupled to a drive unit of a drive assembly of the vehicle, the drive unit being coupled to the steer drive unit.

15. The system according to claim 12, wherein the strain measuring assembly further comprises a load cell sensor arranged to output a signal that corresponds to a measure of the force applied to the steering arm.

16. The system according to claim 15, wherein the load cell sensor comprises a bending beam style sensor with a first end directly affixed to an upper surface of the upper plate and a second end coupled to a shaft that is coupled to the lower plate and extends from the lower plate through an oversized aperture formed in the upper plate.

17. The system according to claim 15, wherein the load cell sensor comprises first and second strain gauge sensors located at different locations on a metal beam of the load cell sensor, wherein the first and second strain gauge sensors sense flexure in the metal beam that results from relative rotational movement between the upper and lower plates.

18. The system according to claim 17, wherein the first and second strain gauge sensors send respective strain measurement signals of the sensed flexure in the metal beam to the controller, wherein the controller processes the strain measurement signals and generates a corresponding control signal that is supplied to the steer drive unit to provide steering assist to the steering arm based upon a level of force detected by the load cell sensor.

19. The system according to claim 18, wherein, if the signals sent by the first and second strain gauge sensors to the controller are not substantially identical, the controller implements a response routine comprising one or more of: implementing a vehicle stop or slowing action, sending an alert to the operator, or dynamically switching steering assist control from one of the first and second strain gauge sensors to the other.

20. The system according to claim 12, wherein a coupling between the steering arm and the strain measuring assembly allows for vertical pivoting movement of the steering arm relative to the strain measuring assembly, wherein such pivoting movement of the steering arm is used to move the steering arm into braking and operating arcs.

21. A system for providing an electrical steering assist for a materials handling vehicle comprising:
 a drive housing;
 a steerable wheel coupled to the drive housing;
 a steering arm pivotally mounted to the drive housing, the steering arm operatively configured to determine a steering direction of the steerable wheel by moving the steering arm from side to side in a generally horizontal plane;
 a steer drive unit coupled to the steerable wheel;
 an input sensing device arranged to detect a turning force applied to the steering arm by an operator, wherein the turning force is provided to change the angle of travel of the vehicle, the input sensing device comprising a strain measuring assembly defining a strain sensitive region between the steering arm and the steer drive unit, wherein the strain measuring assembly comprises an upper plate coupled to the steering arm and a lower plate spaced from the upper plate and coupled to a drive unit of a drive assembly of the vehicle, the drive unit being coupled to the steer drive unit; and
 a controller operatively configured to control the steer drive unit to turn the steerable wheel based upon a signal from the input sensing device.

22. The system according to claim 21, wherein the upper and lower plates are coupled together via a bearing that allows for a small amount of relative rotational movement between the upper and lower plates.

23. The system according to claim 21, wherein the strain measuring assembly further comprises a load cell sensor arranged to output a signal that corresponds to a measure of the force applied to the steering arm.

24. The system according to claim 23, wherein the load cell sensor comprises a bending beam style sensor with a first end mechanically coupled to the upper plate and a second end mechanically coupled to the lower plate.

25. The system according to claim 24, wherein:
 the first end of the load cell sensor is directly affixed to an upper surface of the upper plate; and
 the second end of the load cell sensor is coupled to a shaft that is coupled to the lower plate and extends from the lower plate through an oversized aperture formed in the upper plate.

26. The system according to claim 25, wherein:
 the load cell sensor comprises first and second strain gauge sensors located at different locations on a metal beam of the load cell sensor;
 the first and second strain gauge sensors sense flexure in the metal beam that results from relative rotational movement between the upper and lower plates;
 the first and second strain gauge sensors send respective strain measurement signals of the sensed flexure in the metal beam to the controller; and
 the controller processes the strain measurement signals and generates a corresponding control signal that is supplied to the steer drive unit to provide steering assist to the steering arm based upon a level of force detected by the load cell sensor.

27. The system according to claim 26, wherein, if the signals sent by the first and second strain gauge sensors to the controller are not substantially identical, the controller implements a response routine comprising one or more of: implementing a vehicle stop or slowing action, sending an alert to the operator, or dynamically switching steering assist control from one of the first and second strain gauge sensors to the other.

* * * * *